US012174300B2

(12) United States Patent
Jalali et al.

(10) Patent No.: US 12,174,300 B2
(45) Date of Patent: Dec. 24, 2024

(54) METHOD AND SYSTEM FOR VEHICULAR LIDAR AND COMMUNICATION UTILIZING A VEHICLE HEAD LIGHT AND/OR TAILLIGHT AND LOAD BALANCING BETWEEN LIGHT OR OPTICAL COMMUNICATIONS AND RADIOFREQUENCY COMMUNICATIONS

(71) Applicant: WIRELESS PHOTONICS, LLC, El Segundo, CA (US)

(72) Inventors: Bahram Jalali, Los Angeles, CA (US); Alexandra Jalali, Los Angeles, CA (US); Mehdi Hatamian, Mission Viejo, CA (US); Ahmadreza Rofougaran, Newport Coast, CA (US)

(73) Assignee: Wireless Photonics, LLC, El Sesundo, CA (US)

(*) Notice: Subject to any disclaimer, the term of this patent is extended or adjusted under 35 U.S.C. 154(b) by 0 days.

(21) Appl. No.: 18/779,023

(22) Filed: Jul. 21, 2024

(65) Prior Publication Data

US 2024/0385328 A1    Nov. 21, 2024

Related U.S. Application Data

(63) Continuation-in-part of application No. 18/596,256, filed on Mar. 5, 2024, now Pat. No. 12,066,547.
(Continued)

(51) Int. Cl.
*G01S 17/00* (2020.01)
*G01S 17/10* (2020.01)
(Continued)

(52) U.S. Cl.
CPC ............ *G01S 17/894* (2020.01); *G01S 17/10* (2013.01); *G06T 7/50* (2017.01); *G06T 17/05* (2013.01)

(58) Field of Classification Search
USPC ................................................ 356/4.01, 5.01
See application file for complete search history.

(56) References Cited

U.S. PATENT DOCUMENTS 10,225,011 B1 * 3/2019 Schubert ............ H04B 10/1121
10,816,939 B1 * 10/2020 Coleman ................. G01S 17/86
(Continued)

FOREIGN PATENT DOCUMENTS

CN    102379156 A *  3/2012 ............ G01S 7/4814
CN    110121661 A *  8/2019 ............. G01S 17/89

*Primary Examiner* — James R Hulka

(57) ABSTRACT

A method of measuring a distance between a vehicle and one or more objects, includes generating a modulation signal; generating a modulated light emitting diode (LED) transmission signal, via a vehicle LED driver assembly; transmitting a plurality of light beams based at least in part on the generated modulated LED transmission signal; capturing a reflection of the plurality of light beams off the one or more objects, utilizing one or more lens assemblies and a camera, the camera including an array of pixel sensors and being positioned on the vehicle; communicating a series of measurements representing the captured plurality of light beam reflections; calculating, utilizing the time-of-flight sensor module, time of flight measurements between the vehicle LED light assembly and the one or more objects and calculating distances, utilizing a depth processor module, between the vehicle LED light assembly and the one or more objects based on the time-of-flight measurements.

20 Claims, 15 Drawing Sheets

Related U.S. Application Data which is a continuation of application No. 18/197,798, filed on May 16, 2023, now Pat. No. 11,927,673.

(51) Int. Cl.
*G01S 17/894* (2020.01)
*G06T 7/50* (2017.01)
*G06T 17/05* (2011.01)

(56) References Cited

U.S. PATENT DOCUMENTS

| | | | |
|---|---|---|---|
| 11,329,728 B1* | 5/2022 | Adams | H04B 10/532 |
| 11,800,261 B1* | 10/2023 | Rofougaran | H04B 10/114 |
| 11,927,673 B1* | 3/2024 | Jalali | G01S 17/10 |
| 12,066,547 B1* | 8/2024 | Jalali | H04B 10/116 |
| 2015/0334318 A1* | 11/2015 | Georgiev | H04N 23/56 |
| | | | 348/46 |
| 2016/0086318 A1* | 3/2016 | Hannuksela | G06T 5/50 |
| | | | 348/43 |
| 2020/0119811 A1* | 4/2020 | Kay | H04B 7/18517 |
| 2020/0158834 A1* | 5/2020 | Han | G01S 7/4865 |
| 2020/0284883 A1* | 9/2020 | Ferreira | H04N 25/773 |
| 2020/0309911 A1* | 10/2020 | Meissner | G01S 7/4861 |
| 2020/0326704 A1* | 10/2020 | Blanco | G05D 1/0088 |
| 2021/0112647 A1* | 4/2021 | Coleman | H05B 45/12 |
| 2021/0194583 A1* | 6/2021 | Maho | H04B 10/1123 |
| 2021/0341583 A1* | 11/2021 | Adams | B60R 16/02 |

* cited by examiner

Simple diagram of time flight measurement.

METHOD AND SYSTEM FOR VEHICULAR LIDAR AND COMMUNICATION UTILIZING A VEHICLE HEAD LIGHT AND/OR TAILLIGHT AND LOAD BALANCING BETWEEN LIGHT OR OPTICAL COMMUNICATIONS AND RADIOFREQUENCY COMMUNICATIONS

CROSS-REFERENCE TO RELATED APPLICATIONS/INCORPORATION BY REFERENCE

This application is a continuation-in-part of U.S. non-provisional patent application Ser. No. 18/596,256, filed Mar. 5, 2024, entitled "METHOD AND SYSTEM FOR VEHICULAR LIDAR AND COMMUNICATION UTILIZING A VEHICLE HEAD LIGHT AND/OR TAILLIGHT," which is a continuation of U.S. non-provisional patent application Ser. No. 18/197,798, filed May 16, 2023, entitled "METHOD AND SYSTEM FOR VEHICULAR LIDAR AND COMMUNICATION UTILIZING A VEHICLE HEAD LIGHT AND/OR TAILLIGHT," now U.S. Pat. No. 11,927,623, the disclosures of which are all hereby incorporated by reference.

FIELD OF TECHNOLOGY

Certain embodiments of the disclosure relate to a vehicle light detection and ranging (LIDAR) system and other embodiments relate to a vehicle communication system. More specifically, certain embodiments of the disclosure relate to a vehicle lidar system utilizing a light emitting diode (LED) light assembly and certain embodiments of the disclosure relate to a vehicle communication system utilizing a LED light assembly in an outdoor environment.

BACKGROUND

Driver assistance and autonomous driving systems require a three-dimensional ("3D") camera, known as light detection and ranging ("lidar"), that senses the distance (range) to objects in front of the car. Most of the existing laser-based lidar techniques employ laser scanning of a targeted object and measure a range by pulsed time-of-flight (TOF) measurements—i.e., the time it takes each laser pulse to hit the target and return to a sensor. An autonomous driving system may also use another technique that scans a targeted object using a frequency swept (FMCW) laser followed by coherent detection, similar to a radio frequency FMCW radar. Currently, both of these techniques are too costly for the automotive or moving vehicle industry.

A driver assistance and autonomous driving system may also use an alternative 3D imaging technique named flash lidar. In flash lidar, an entire field of view is illuminated with a wide diverging optical beam in a single pulse. This is in contrast to conventional scanning lidar, which uses a collimated laser beam that illuminates a single point at a time and the collimated laser beam is raster scanned to illuminate a field of view point-by-point. In these environments, the depth information is collected using a time of flight (TOF) of the laser pulse which requires a pulsing of the laser and acquisition by a camera, where the laser and camera are to be synchronized. By measuring the time of flight at every pixel of the camera, a 3D image of the target object is formed. However, because the energy of the laser is spread over an entire field of view, an illumination power and also a sensitivity is reduced. To compensate for this in flash lidar, a laser must be high power which increases the cost and also creates eye safety problems.

Further limitations and disadvantages of conventional and traditional approaches will become apparent to one of skill in the art, through comparison of such systems with some aspects of the present disclosure as set forth in the remainder of the present application with reference to the drawings. A need exists for a low cost system that utilizes existing vehicle components for both a LIDAR system and a communication system.

BRIEF SUMMARY OF THE DISCLOSURE

A light detection and ranging (lidar) system and method utilizing a vehicle's existing, i.e., native LED light assembly to determine distances between a vehicle and one or more objects and providing the acquired information to the vehicle's self-driving or driver-assist system, substantially as shown in and/or described in connection with at least one of the figures, as set forth more completely in the claims. A communication system and method utilizing a vehicle's existing, i.e., native LED light assembly to communicate between a first vehicle and a second vehicle, without relying on a cellular network, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Figure 1:
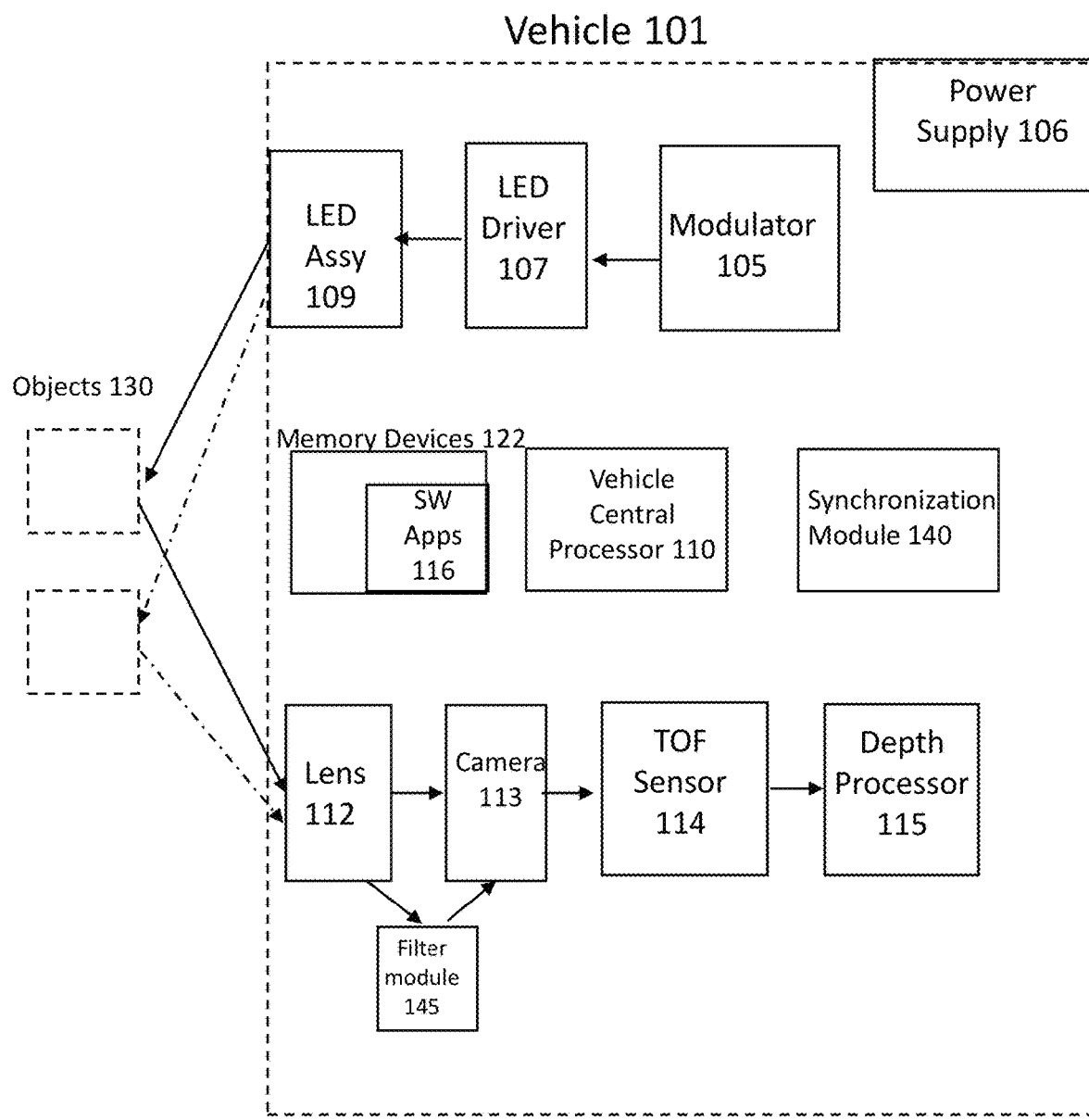
FIG. 1 is a block diagram that illustrates various components of an exemplary vehicle light detection and ranging (LIDAR) system, in accordance with en exemplary embodiment of the disclosure.

The following detailed description provides a better understanding of the features and advantages of the inventions described in the present disclosure in accordance with the embodiments disclosed herein. The following detailed description describes a method and system that utilizes a vehicle LED light assembly in a LIDAR system and a vehicle LED light assembly to communicate between a first vehicle and a second vehicle.

The subject matter disclosed herein is a vehicle three-dimensional (3D) imaging system that utilizes a vehicle's headlight or taillight to achieve ranging, (i.e. the measurement of a distance from vehicles to objects. Applications that may utilize the subject matter described herein may include, but are not limited to transportation and/or robotics. The subject matter described herein reduces a cost of a vehicle LIDAR system by utilizing many existing aspects and/or components of a vehicle, by eliminating the need for a laser for illumination of the scene and eliminating the need for laser scanning. The subject matter described herein exploits and utilizes the LED light assemblies in the vehicle (e.g., LED headlights and taillights) present in modern day vehicles. The present invention exploits the fact that, unlike the old gas-discharge headlights (e.g., halogen lights), LEDs may be modulated at high frequencies. This property of LED allows the LED light assemblies to be used as a light source and a camera (with an array of pixel sensors) to be utilized as a detector for a reflected plurality of modulated light beams which may be utilized by a time-of-flight module for calculating a range or distance from the measured object(s) to the vehicle. It is understood that the fundamental maximum modulation speed of an LED is limited by the spontaneous emission lifetime in the semiconductor or the capacitance of the LED, including the capacitance of the electrodes and the wiring. In these implementations, the LED assembly wiring may be modified to get a benefit of modulating the LEDs at a higher frequency or speed.

The low coherence of the LED light assemblies (compared to a high coherence of a laser assembly) is not a problem with the systems and methods described herein because time of flight measurements are based on direct measurement of light power in the reflected plurality of light beams and not the light beams' electric field. Further, the taillight may also be utilized as a light source with the subject matter disclosed herein because the range or distance measurement is based on the time of arrival of the intensity of the reflected light beams and not a color of the light. Accordingly, a red color of the rear lights does not impact an accuracy of the range measurement. Nevertheless, a color filter may be used before the detector in the receiver to filter out unwanted light from entering the receiver.

In the following description, reference is made to the accompanying drawings, which form a part hereof, and in which is shown, by way of illustration, various embodiments of the present disclosure.

FIG. 1 is a block diagram that illustrates various components of an exemplary vehicle light detection and ranging (LIDAR) system, in accordance with en exemplary embodiment of the disclosure. With reference to FIG. 1, there is shown a vehicle LIDAR system 100 in a vehicle 101 which may include one or more power supplies 106, one or more signal modulators 105, one or more light-emitting diode (LED) drivers 107, one or more LED light assemblies 10109, a vehicle central processor 110, one or more lenses or lens assemblies 112, one or more cameras 113 including arrays of pixel sensors, one or more time-of-flight (TOF) sensor modules 114, one or more depth processors 115, one or more additional vehicle processors (not shown) one or more software applications 116, one or more memory devices 122 and/or one or more vehicle subsystems (which are described in detail with respect to FIG. 4). In some implementations, the vehicle LIDAR system 100 may further include a synchronization module 140 and/or a filter module 145.

In exemplary embodiments, a vehicle 101 may be an automobile, a truck, an agricultural vehicle (tractor) including a light assembly, an electric bicycle including a light assembly, an auto terrain vehicle (ATV) including a light assembly, a motorcycle including a light assembly, an airplane, a golf cart including a light assembly, a robot or autonomous delivery vehicle including a light assembly or a moving vehicle including a light assembly. Any device that moves and includes a light assembly may also be referred to as a vehicle.

In exemplary embodiments, the vehicle 101 may include one or more power supplies 106. The one or more power supplies 106 may be one or more batteries. In some embodiments, the one or more batteries may be charged via electric vehicle charging systems if a vehicle is all electric. In some embodiments, the one or more batteries may be powered utilizing a gas combustion engine system. In some implementations, the one or more batteries may be powered utilizing a hydrogen gas combustion system. In exemplary embodiments, the one or more power supplies 106 may be coupled or connected to other electrical components in the vehicle 101 and/or electrical or electromechanical subsystems.

In exemplary embodiments, the vehicle LIDAR system may include one or more signal modulators 105. In some implementations, the one or more signal modulators 105 may utilize pulse modulation, or alternatively, may utilize sinusoidal modulation. In some implementations, the one or more signal modulators 105 may generate modulation signals having a frequency ranging from 100 Megahertz to 300 Megahertz. In alternative implementations, the one or more signal modulators 105 may generate modulation signals having a frequency ranging from 75 Megahertz to 600 Megahertz. It is understood that the fundamental maximum modulation speed of an LED is limited by the spontaneous emission lifetime in the semiconductor. The maximum speed may be further restricted by the capacitance of the LED, including the capacitance of the electrodes and the wiring. In this context, certain analog circuit techniques, such as pre-emphasis or RF peaking techniques, may be used to extend the LED bandwidth and hence increase its modulation speed.

In exemplary embodiments, the one or more signal modulators 106 may be coupled or connected to the one or more LED driver assemblies 107. The one or more LED driver assemblies 107 may generate a modulated LED transmission signal based at least on part on the modulation signal. In some implementations, the one or more LED driver assemblies 107 may be integrated circuits manufactured by Texas Instruments, ST, Infineon, and ON Semiconductor.

In exemplary embodiments, the vehicle LED light assembly 109 may be communicatively coupled or connected to the LED driver assembly 107. In exemplary embodiments, the LED light assembly 109 may transmit or generate a plurality of light beams. The plurality of light beams may be based at least on the generated modulated LED transmission signal. The vehicle LED light assembly 109 may be a vehicle headlight, or alternatively, may be a vehicle taillight. In implementations, the vehicle LED light assembly 109 may include multiple LED lights. In some implementations, the vehicle LED light assembly may be a LED headlight, a LED taillight, a LED light assembly installed on a front portion of a vehicle or a LED light assembly installed on a rear portion of a vehicle. Utilizing an existing vehicle LED light assembly 109 for a vehicle LIDAR system and eliminating the laser scanning decreases overall cost for the LIDAR system. In the subject matter described herein, the elimination of a laser also reduces an amount of power that the vehicle 101 may expend in determining a distance between a vehicle and/or one or more objects.

In exemplary embodiments, one or more objects 130 may be located in an outdoor environment with a vehicle 101 and in other exemplary embodiments, the one vehicle 101 and the one or more objects 130 may be located in an indoor environment, or alternatively, in an outdoor environment. The automotive lidar system 100 may be utilized to determine distances between the one or more objects 130 and the vehicle 101. In some implementations, the one or more plurality of light beams may reflect off of the one or more objects 130 and may create a plurality of reflected light beams. In some implementations, the plurality of reflected light beams may be captured or received by one or more cameras located or installed on the vehicle. The one or more objects 130 may be people, animals, furniture, buildings, or parked vehicles. The generation of the reflected plurality of light beams may occur continuously as well as the one or more cameras may receive and/or capture the reflected plurality of light beams continuously.

In exemplary embodiments, the plurality of reflected light beams may pass through one or more lens assemblies 112 installed in the vehicle. In some implementation, the one or more lens assemblies 112 may focus the plurality of reflected light beams onto an array of pixel sensors in the one or more cameras 113.

In exemplary embodiments, the one or more lens assemblies 112 may be in front on the one or more cameras 113 on the vehicle and/or may be communicatively coupled or connected to the one or more cameras 113. In exemplary embodiments, after passing through the one or more lens assemblies 112, the plurality of reflected light beams may be captured by the one or more cameras 113 positioned on the vehicle. In some implementations, the one or more cameras 113 in the vehicle may include respective one or more arrays of pixel sensors. The array of pixel sensors of the cameras 113 may capture the plurality of reflected light beams and may generate a plurality of measurements representing the captured intensity of a plurality of reflected light beams. In some implementations, the camera including the array of sensor pixels may be an Analog Devices ADSD3100 integrated circuit, although other cameras may be utilized. In some implementations, the camera including the array of sensor pixel may be a three-dimensional camera, or alternatively, a two-dimensional camera. In some implementations, a number of the components, e.g., the one or more lens assemblies 112, the camera including one or more arrays of pixel sensors 113, the vehicle LED assembly 109, and/or the vehicle LED driver assembly 107 may all be located or part of a single chipset. This reduces size and space requirements in the vehicle.

Figure 2:
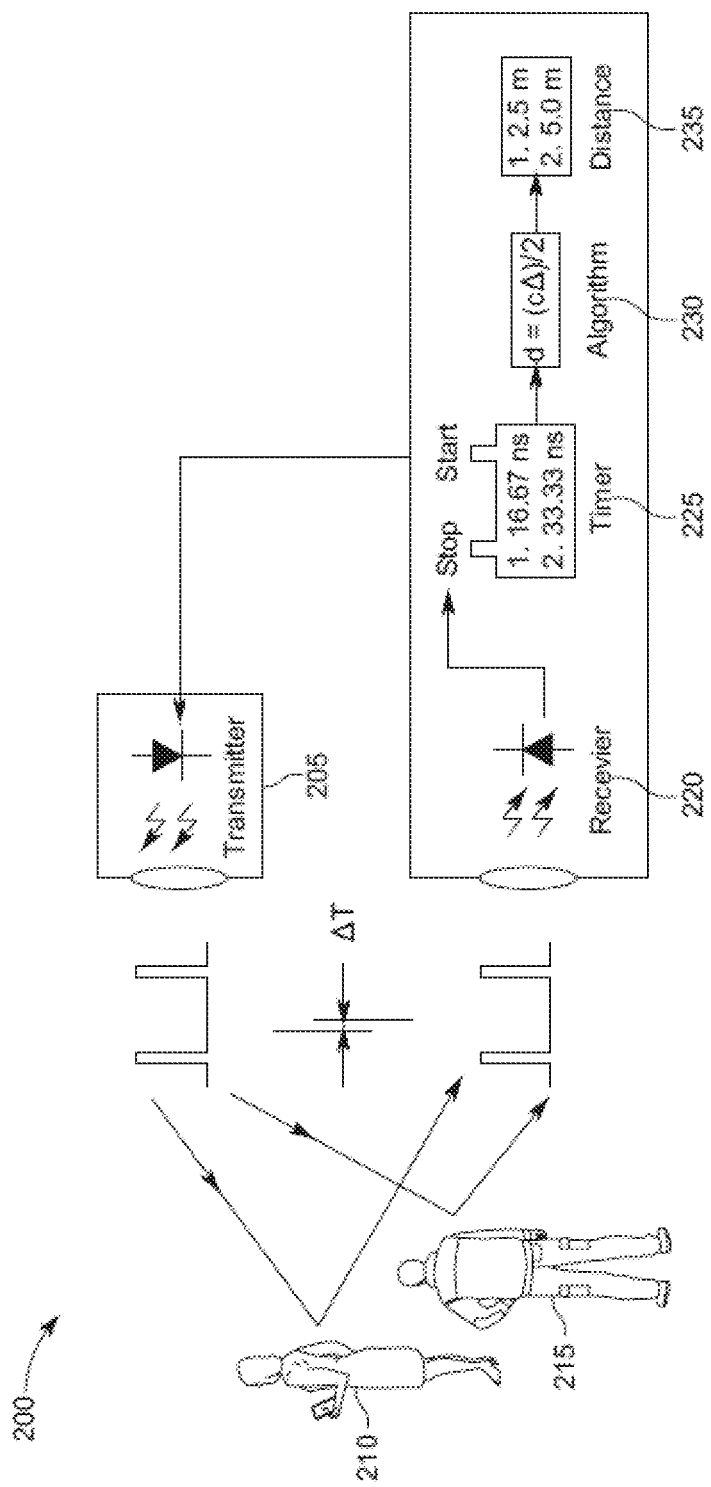
FIG. 2 is a block diagram illustrating calculation of time-of-flight measurements in accordance an exemplary embodiment of the disclosure.

In exemplary embodiments, the one or more cameras 113 may be communicatively coupled or connected to a time-of-flight sensor module 114. In some implementations, the one or more cameras 113 may communicate the generated plurality of measurements to the time-of-flight sensor module 114. The time-of-flight sensor module 114 may calculate a plurality of time-of-flight (TOF) measurements between the vehicle 101 and the one or more objects 130. FIG. 2 illustrates calculation of TOF measurements between a vehicle and two objects according to exemplary embodiments.

FIG. 2 is a block diagram illustrating calculation of time-of-flight measurements in accordance an exemplary embodiment of the disclosure. A TOF system 200 includes a vehicle LED transmitter or lighting assembly 205, one object (a person) 210, a second object 215 (a person), a vehicle camera 220, a vehicle timing subsystem 225, and/or software 230 for calculating a distance between the vehicle LED transmitter or lighting assembly 205 and the plurality of objects 210 and 215 (people 210 and 215). In some implementations, the vehicle LED transmitter or lighting assembly 205 transmits a plurality of modulated light beams towards the first object 210 and the second object 215. A plurality of reflected light beams may bounce off of the first object 210 and the second object 215 or be reflected from the first object 210 and the second object 215. In some implementations, a camera including an array of sensor pixels or a receiver 220 may capture the reflected light beams and may generate light intensity measurements based on the captured reflected light beams. A time-of-flight module including a timer 225 may receive the generated light intensity measurements and may generate a time between pulses of the transmitted plurality of modulated light beams and the captured reflected light beams for the first object 210 and the second object 215. In some implementations, the time-of-flight module measures the time delay A between when the light is emitted or transmitted from the vehicle LED light assembly 205 and when the reflected light is received by the camera including an array of sensor pixels 220. The time delay is proportional to twice the distance between the camera 220 and the first object 210 and the second object 215, therefore the distance can be estimated as depth=$c\Delta/2$ where c is the speed of light. As an illustrated example as shown in FIG. 2, the time-of-flight module including a timer 225 may generate a time of 16.67 nanoseconds between pulses with respect to the first person (object) 210 or may generate a time of 33.33 nanoseconds between pulses with respect to the second person (object) 215. The depth processor module including a distance generation algorithm 230 may calculate a distance between the first person (object) 210 and a vehicle LED light assembly 205 of 2.5 meters (reference number 235) and a distance between the second person (object) 215 and a vehicle LED light assembly 205 of 5.0 meters (reference number 235).

In exemplary embodiments, a depth processor or depth processor module 115 may be communicatively coupled or connected to the TOF sensor module 114. The depth processor or depth processor module 115 may receive the plurality of TOF measurements from the TOF sensor module 114. The depth processor or depth processor module 115 may calculate a plurality of distances between a vehicle and a plurality of objects. In some implementations, the plurality of distances may be stored in one or more memory devices 122 in the vehicle. In other implementations, the distance maybe encoded into color with the image shown on a monitor inside the vehicle.

In exemplary embodiments, a vehicle central processor 110 may be communicatively coupled to one or more memory devices 122 and/or a depth processor or depth processor module 115. In some implementations, the vehicle central processor 110 may retrieve the plurality of distances from the one or more memory devices 122 and may communicate the plurality of distances to other vehicle subsystems (e.g., a vehicle navigation subsystem system, a vehicle braking subsystem, a vehicle transmission subsystem, a vehicle steering system, a vehicle audio system or a vehicle display subsystem, which are described in detail below) in order for the other vehicle subsystems to utilize the plurality of distances in operation of these subsystems. In some implementations, the vehicle central processor 110 may communicate with the depth processor or depth processor module 115 to instruct the depth processor or depth processor moule 115 to communicate the plurality of distance measurements to one or more of the other vehicle subsystems.

The vehicle central processor 110 may include suitable logic, circuitry, and/or interfaces configured to control various components in the vehicle LIDAR system and/or the vehicle central processor 110 may execute instructions stored in the one or more memory devices 122. Example of the implementation of the vehicle central processor 110 may include, but are not limited to an embedded processor, a field-programmable gate array (FPGA), a microcontroller, a specialized DSP, an Application-Specific Integrated Circuit (ASIC) processor, a Graphics Processor Unit (GPU) and/or other processors.

In exemplary embodiments, in order to continuously monitor a distance between the one or more objects and/or the vehicle, the system and/or device described above will continuously operate while the vehicle is powered on.

In exemplary embodiments, one or more software application programming interfaces (APIs) 116 may be stored in one or more memory devices 122. In some implementations, one or more software APIs 116 may be executable by the vehicle central processor 110 in order to communicate with the one or more other vehicle subsystems.

The one or more memory devices 122 may include suitable logic, circuitry, and/or interfaces that may be configured to store computer-readable instructions executable by the vehicle central processor 110. Examples of implementation of the one or more memory devices 122 may include, but are not limited to, a random access memory (RAM), a dynamic random access memory (DRAM), a static random access memory (SRAM), a processor cache, a thyristor random access memory (T-RAM), a zero-capacitor random access memory (Z-RAM), a read only memory (ROM), a hard disk drive (HDD), a secure digital (SD) card, a flash drive, cache memory, and/or other non-volatile memory. It is to be understood by a person having ordinary skill in the art that a memory controller may control operation of the one or more memory devices 122 and may further include one or more other components, such as an analog to digital converter (ADC), a digital to analog (DAC) converter, a cellular modem, and the like, known in the art, which are omitted for brevity.

Figure 4:
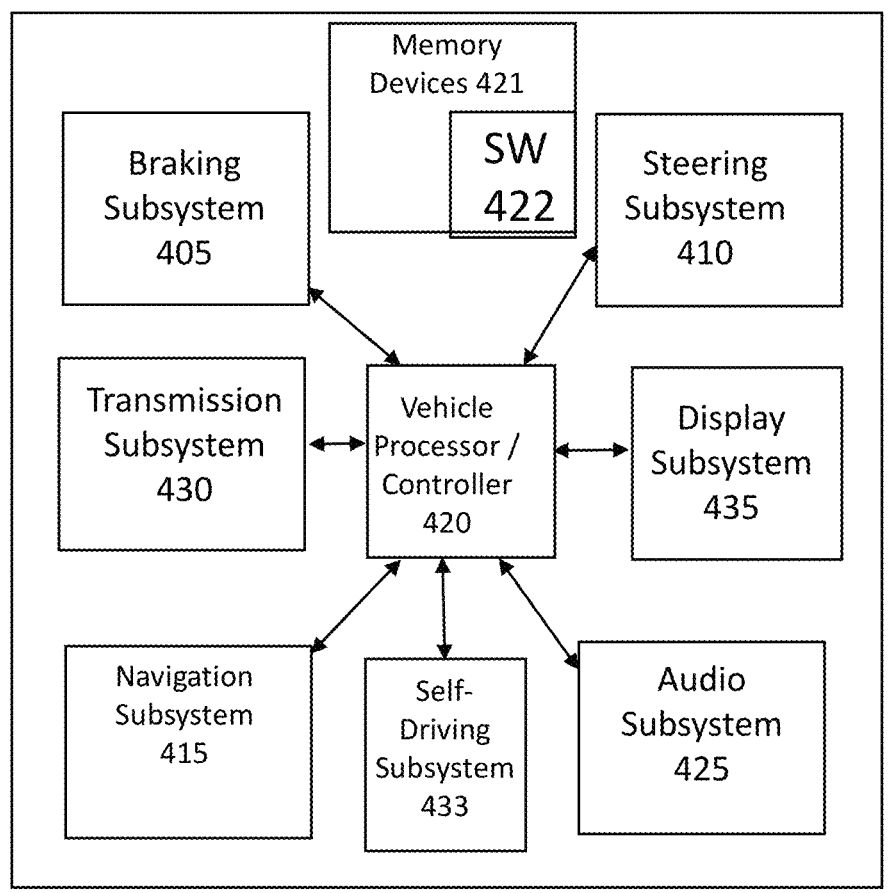
FIG. 4 is a block diagram of a vehicle processor and a plurality of vehicle subsystems, in accordance with an embodiment of the disclosure.

In exemplary embodiments, various components (e.g., the depth processor 115, the TOF sensor 114, the camera 113, the signal modulator 105, the LED Driver 107 and/or the LED assembly 109 may utilize a number of different communication protocols when communicating with the vehicle central processor 110. These communication protocols may include the Mobile Industry Protocol Interface (MIPI), the Serial Peripheral Interface (SPI) and/or the Inter-Integrated Circuit interface (I2C). In exemplary embodiments, the vehicle central processor 110 described above may communicate with communicate with various other subsystems utilizing a Controller Area Network bus (CANbus). Communication may occur utilizing a Controller Area Network (CAN) protocol. In some implementations, the vehicle may include a number of subsystems (e.g., as illustrated in FIG. 4 and described below) including, but not limited to, a vehicle braking subsystem 405, a vehicle transmission subsystem 430, a vehicle steering subsystem 410, a vehicle audio subsystem 425, and a vehicle display subsystem 435. In some implementations, a vehicle central processor 110 may communicate with the subsystems over a CANbus utilizing a CAN protocol. The subsystems may also be referred to as electronic control units (ECUs). In some implementations, the ECUs may have sensors and switches wired in to detect variables such as temperature, pressure, voltage, acceleration at different angles, braking, yaw and roll of the vehicle, steering angle, and many other signals. When an ECU needs a signal from a sensor connected to an ECU elsewhere in the car, the ECUs or subsystems may communicate utilizing the CANbus.

Current vehicle-to-vehicle technologies include Cellular V2X (C-V2X), which is a 3GPP standard for self-driving cars, and Dedicated Short Range Communications (DSRC), which warns drivers of an impending dangerous condition or event in time to take corrective or evasive actions. C-V2X and DSRC are both wireless-based and require a communication infrastructure or network to be in place. However, the subject matter described herein does not require a wireless network or communication interface and includes direct communication between the vehicles. The subject matter described herein can operate in all environmental conditions. In addition, the subject matter described herein is low latency compared to the current wireless vehicle-to-vehicle technologies due to the directness of the communication along with speed of light transmission. This is a significant benefit over the current vehicle-to-vehicle technologies and is vital with respect to self-driving cars and/or car safety where speed of communication between vehicles is imperative. Another application of the subject-matter described herein is the ability to have covert communications between two or more vehicles that other drivers cannot intercept and would be unaware is even occurring.

In exemplary embodiments, a braking software API may be executable by the vehicle central processor 110 to communicate with the vehicle braking subsystem 405. In some implementations, the vehicle central processor 110 may utilize the vehicle braking subsystem 405 to instruct the vehicle braking subsystem 405 to activate or deactivate. As an example, the vehicle central processor 110 may determine, if any of the received distance measurements are too close to the vehicle, to instruct the braking subsystem 405 to activate in order to apply one or more brakes to stop the vehicle or decrease the vehicle's speed.

In exemplary embodiments, a vehicle transmission system API may be executable by the vehicle central processor 110 to communicate with the vehicle transmission subsystem 430. In some implementations, the vehicle central processor 110 may utilize the vehicle transmission subsystem 430 to instruct the vehicle transmission subsystem 430 to move or not move to a specific gear (e.g., drive, reverse, neutral). As an illustrative example, the vehicle central processor 110 may determine, if any of the received plurality of distance measurements are too close to the vehicle, to instruct to vehicle transmission subsystem 430 to move a transmission or gearing assembly to drive or reverse in order to keep the vehicle from hitting another or coming closer to one or more objects.

In exemplary embodiments, a steering API may be executable by the vehicle central processor 110 to communicate with the vehicle steering subsystem 410. In some implementations, the vehicle central processor 110 may utilize the steering API to instruct the vehicle steering subsystem 410 to turn the vehicle in a specific direction. As an example, the vehicle central processor 110 may determine, if the plurality of received distance measurements identify one or more objects are on the right, to instruct the vehicle steering subsystem 410 to turn the vehicle to the left in order to move away from the detected one or more objects.

In exemplary embodiments, an audio software API may be executable by the vehicle central processor 110 to communicate with the vehicle audio subsystem 425. In some implementations, the vehicle central processor 110 may utilize the audio software API to instruct the vehicle audio subsystem 425 to create sounds. As an example, the vehicle central processor 110 may determine, if any of the received distance measurements are too close to the vehicle, to instruct the vehicle audio subsystem 425 to speak a message in order to let a driver or passenger that the one or more objects is close and to adjust he to stop the vehicle or decrease the victim's speed.

In exemplary embodiments, a display software API may be executable by the vehicle central processor 110 to communicate with the vehicle display subsystem 435. In some implementations, the vehicle central processor 110 may utilize the display software API to instruct the vehicle display subsystem 435 to display a message or an image. As an example, the vehicle central processor 110 may determine, if any of the received distance measurements are too close to the vehicle, to instruct the vehicle display subsystem 435 to display a message that the one or more objects are too close and/or to display an image showing a location of the one or more objects in order to make the driver aware of the one or objects.

In exemplary embodiments, the vehicle LIDAR system 100 may include a synchronization module 140. The synchronization module 140 may be implemented in software, hardware and/or a combination thereof. In some implementations, a synchronization module 140 may be configured to synchronize the camera 113 and the modulation signal from the signal modulator 105. In some implementations, the signal modulator 105 and/or the camera 113 may utilize code division multiple access (CDMA) protocols. The signal modulator 105 may, using CDMA protocols, assign the modulation signal a specific code. The camera module 113 (including the array of pixel sensors) may be configured to capture the plurality of reflected light beams that include the assigned specific code. The other reflected light beams that do not include the specific code may be discarded and not utilized. This will allow stray light from other light sources such as other automobiles, street lights, natural light sources like the moon and the sun, for example, that may be picked up by the camera module 113 to not be utilized in determining the time-of-flight measurements. In other words, utilizing CDMA filtering and protocols allows the vehicle lidar system 101 to filter out and utilize only the plurality of reflected light beams that are transmitted by the vehicles LED light assemblies. This improves an accuracy of the vehicle LIDAR system 100.

In exemplary embodiments, the vehicle LIDAR system 100 may further include an optical filter module 145. The filter module 145 may be coupled or connected to the one or more cameras including arrays of pixel sensors 113. In some implementations, the signal modulator 105 may utilize one single frequency or a specific number of single frequencies when generating the modulation signal. The filter module 145 may receive the plurality of reflected light beams and may filter out any of the plurality of reflected light beams whose frequency is not the single frequency (or the other number of single frequencies). This also allows the vehicle lidar system 101 to filter out and only use the plurality of reflected light beams that are transmitted by the vehicle LED light assembly 109. This also improves the accuracy of the vehicle LIDAR system 100.

Figure 3:
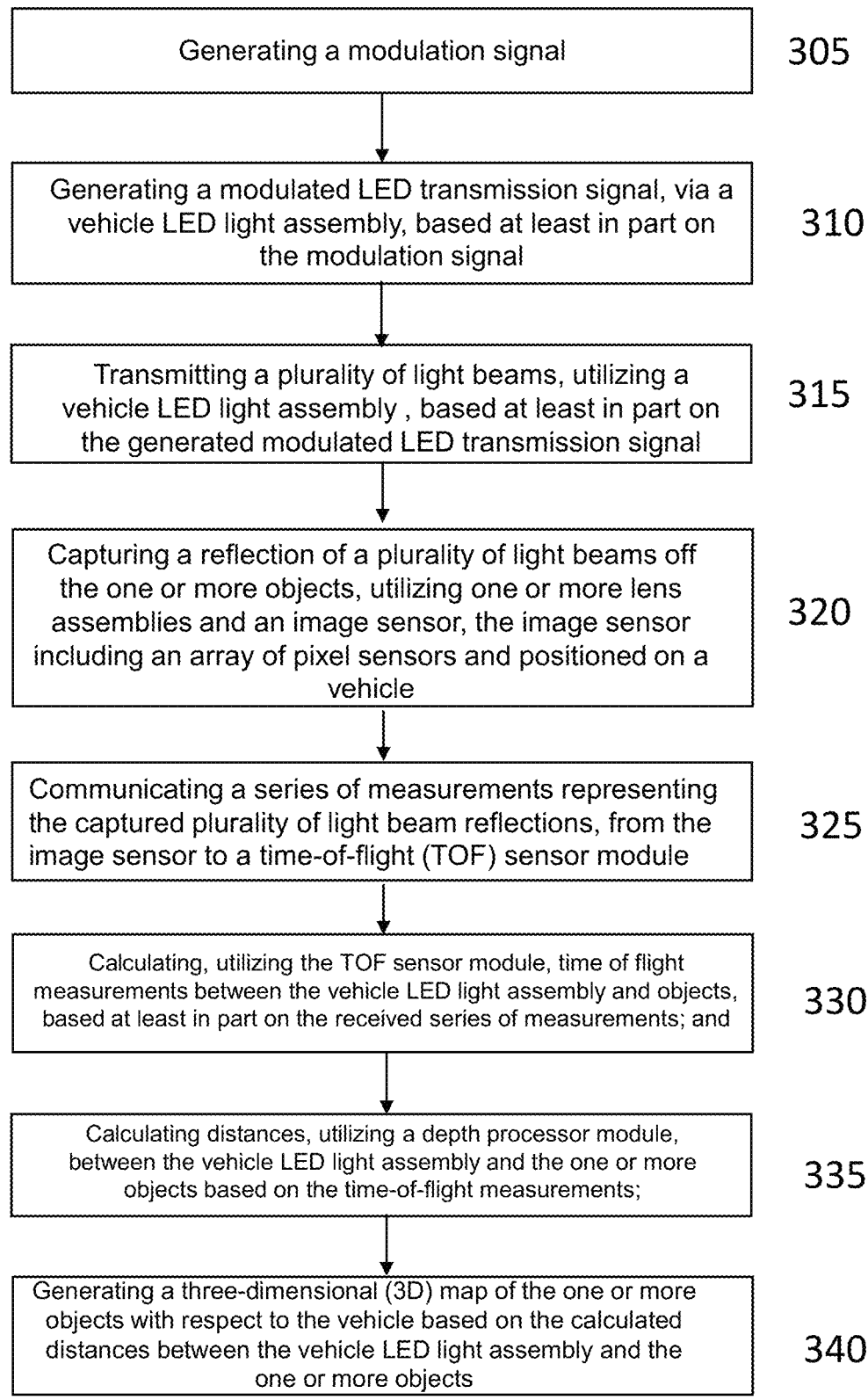
FIG. 3 is a flowchart that illustrates an exemplary method for utilizing a vehicle's LED light assembly-based LIDAR system to calculate distances between a vehicle and one or more objects, in accordance with an embodiment of the disclosure.

FIG. 3 is a flowchart that illustrates an exemplary method for operating a vehicle light emitting diode (LED) light assembly (e.g., a LED head light and tail light) for vehicular light detection and ranging (LIDAR), in accordance with an embodiment of the disclosure. FIG. 3 is explained in conjunction with elements from FIGS. 1 and 2. With reference to FIG. 3, there is shown a flowchart 300 comprising exemplary operations 305 through 340.

At 305, a modulation signal may be generated by a signal modulator 105. A LED driver assembly 107 may be configured to receive the modulation signal from the signal modulator 105.

At 310, a modulated LED transmission signal may be generated via the vehicle LED driver assembly 107 based at least in part on the modulation signal. The vehicle LED assembly 109 may be configured to receive the modulated LED transmission signal.

At 315, a plurality of modulated light beams may be generated via the vehicle LED light assembly 109, based at least in part on the modulated LED transmission signal. The plurality of modulated light beams may strike and/or be reflected off of a plurality of objects 130 that are located in an environment with a first vehicle 101.

At 320, a plurality of light beam reflections from one or more objects 130 may be captured utilizing an array of pixel sensors of a camera 113. In an exemplary embodiment, the plurality of light beam reflections may pass through one or more lens assemblies 112 before being captured by the array of pixel sensors 113.

At 325, a series of measurements representing an intensity of the captured plurality of light beam reflections, may be generated by the array of pixel sensors of the camera 113. In an exemplary embodiment, the generated series of measurements may be communicated to a time-of-flight sensor module 114, which may be configured to receive the generated series of measurements.

At 330, a plurality of time-of-flight (TOF) measurements may be calculated, utilizing the TOF sensor module, based at least in part on the series of measurements received from the array of pixel sensors representing the captured plurality of light beam reflections. In an exemplary embodiment, a depth processor 115 may be configured to receive the plurality of the TOF measurements from the TOF sensor module 114.

At 335, a plurality of distances may be calculated between a vehicle LED light assembly 109 (and thus the vehicle 101) and one or more objects 130 131, utilizing a depth processor module 115, based on the generated time-of-flight measurements. In an exemplary embodiment, a vehicle central processor 110 may be configured to receive the plurality of distances between the vehicle LED light assembly 109 and the one or more objects 130.

At 340, a vehicle central processor 110, may utilize a calculated one or more distances with a variety of different software applications in the vehicle and/or may store the calculated one or more distances in one or more memory devices 122 of a vehicle 100. In an exemplary embodiment, the vehicle central processor 110 may communicate the calculated one or more distances to various other components and/or subsystems in the first vehicle 100.

In some implementations, a vehicle central processor 110 may communicate the one or more distances to a vehicle navigation subsystem 415. As an illustrative example, a three-dimensional (3D) map may be generated utilizing the one or more distances between the one or more objects 130 with respect to the vehicle LED light assembly 109.

In some implementations, a vehicle central processor 110 may communicate the one or more distances to a vehicle braking subsystem 405. The vehicle braking subsystem 405 may analyze the distances, and if the distances between the vehicle LED light assembly 109 and the one or more objects 130 are too small, the vehicle braking subsystem 405 may activate one or more vehicle brakes.

In some implementations, a vehicle central processor 110 may communicate the one or more distances to a vehicle drive or transmission subsystem 430. The vehicle transmission subsystem may analyze the received distances and if the distances between the vehicle LED light assembly 109 and the one or more objects 130 are too small, the vehicle transmission subsystem 430 may disengage the vehicle driving subsystem.

In some implementations, a vehicle central processor 110 may communicate the one or more distances or ranging measurements to a self-driving subsystem 433. The self-driving subsystem controls operations of the vehicle when the vehicle is driverless and thus operating autonomously. In some implementations, the self-driving subsystem 433 may receive the distances or ranging measurements, may analyze the distance or ranging measurements and may communicate instructions to other subsystems (vehicle navigation subsystem 415, vehicle braking subsystem 405, vehicle drive or transmission subsystem 430, vehicle display system 435 or vehicle audio system 425) to identify and control operations of the driverless vehicle. As an example, if distances or ranging measurements to the plurality of objects are too small, the self-driving subsystem 433 may communicate to the braking subsystem 405 that the brakes should be applied and/or may communicate to the vehicle display system 435 to display a warning.

In some implementations, a vehicle central processor 110 may communicate the one or more distances to a vehicle display system 435. The vehicle display system 435 may analyze the received distances and may generate a display object identifying specific distances between the vehicle LED light assembly 109 and the one or more objects or may generate an error message or error display object to warn a driver of a vehicle.

In some implementations, a vehicle central processor 110 may communicate the one or more distances to a vehicle audio system 425. The vehicle audio system 425 may analyze the received distances and may generate an audible sound alert identifying that one or more distances are too close and that a driver of a first vehicle 100 should take evasive measures in order to avoid the one or more objects.

FIG. 4 is a block diagram illustrating various components of an exemplary vehicle in accordance with an exemplary embodiment of the disclosure. FIG. 4 is explained in conjunction with elements from FIGS. 1-3 and 4-6. With reference to FIG. 4, there is shown a block diagram 400 of the vehicle main processor 420, one or more memory devices 421, computer-readable instructions 422 stored in the one or more memory devices 421, a braking subsystem 405, a steering subsystem 410, a navigation subsystem 415, an audio subsystem 425, a transmission subsystem 430, and/or a display subsystem 435. In some implementations, the computer-readable instructions stored in the one or more memory devices may be executable by the one or more vehicle processor controller 420 to communicate with the other vehicle subsystems in order to transmit and/or receive data and/or instructions from the other vehicle subsystems. As described above with respect to FIG. 1-3, a plurality of distance and/or directional measurements may be received from the depth processor module 115. In these implementations, computer-readable instructions may be executable by the vehicle processor controller 420 to communicate the plurality of distance and/or directional measurements to the other vehicle subsystems. As described above with respect to FIG. 4-6, the decoded one or more messages may be received from the decoder assembly or module 545 or 517. In these implementations, computer-readable instructions may be executable by the vehicle processor controller 420 to communicate the decoded one or more messages to the other vehicle subsystems.

Figure 5:
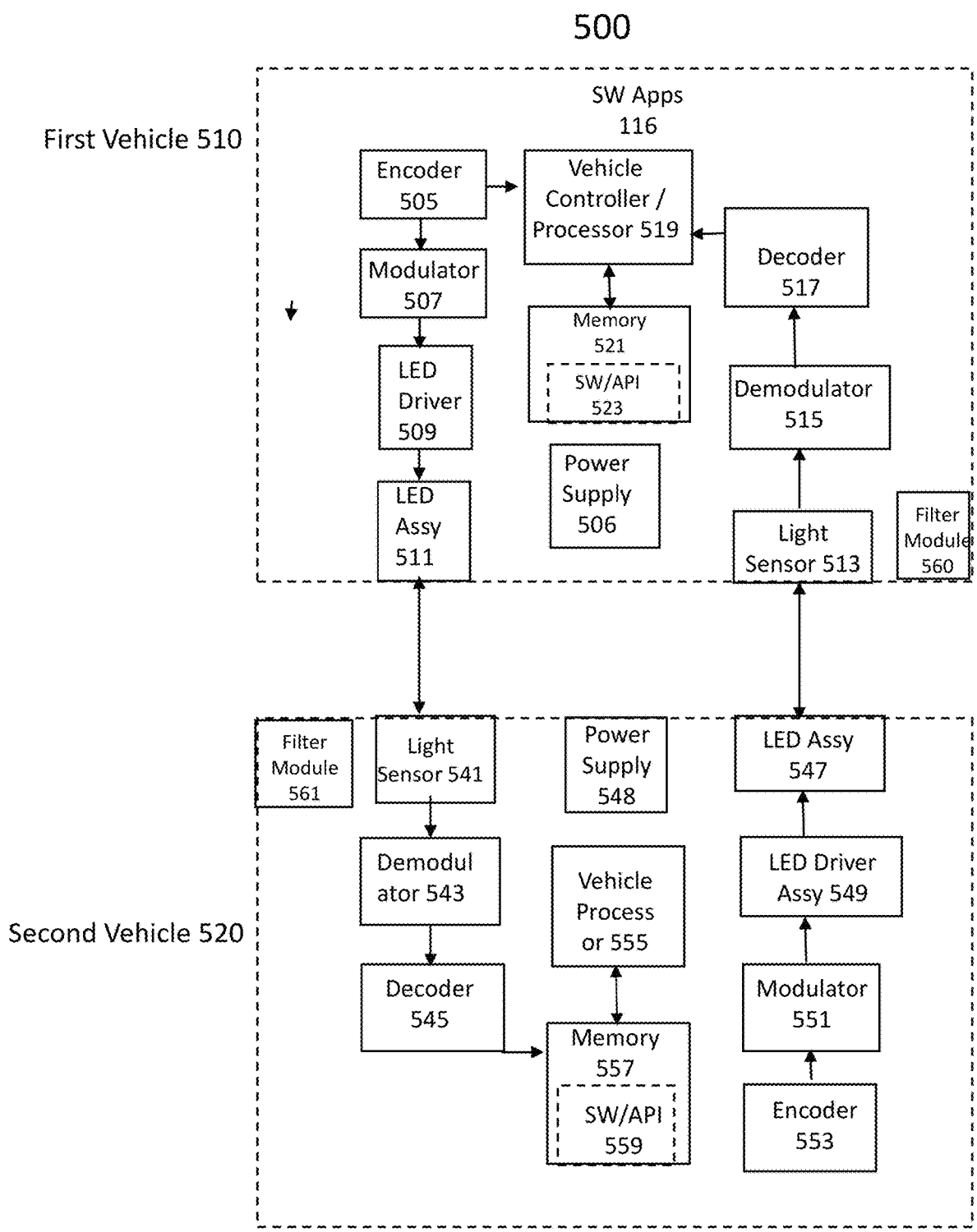
FIG. 5 is a block diagram that illustrates various components of an exemplary LED light communication system, in accordance with an exemplary embodiment of the disclosure.
Figure 6:
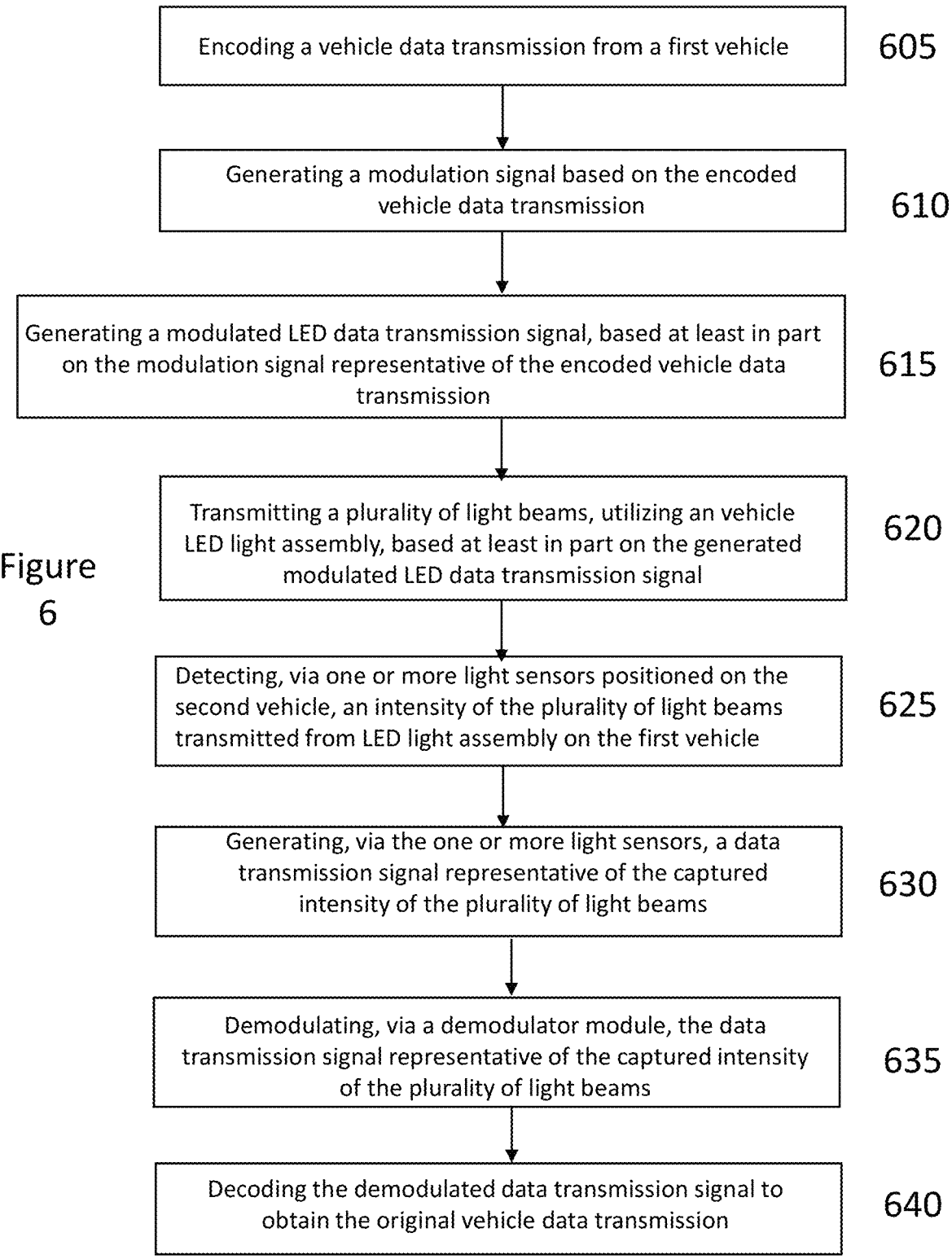
FIG. 6 is a flowchart that illustrates an exemplary method for utilizing a LED assembly to communicate between a first vehicle and a second vehicle, in accordance with an embodiment of the disclosure.
Figure 7:
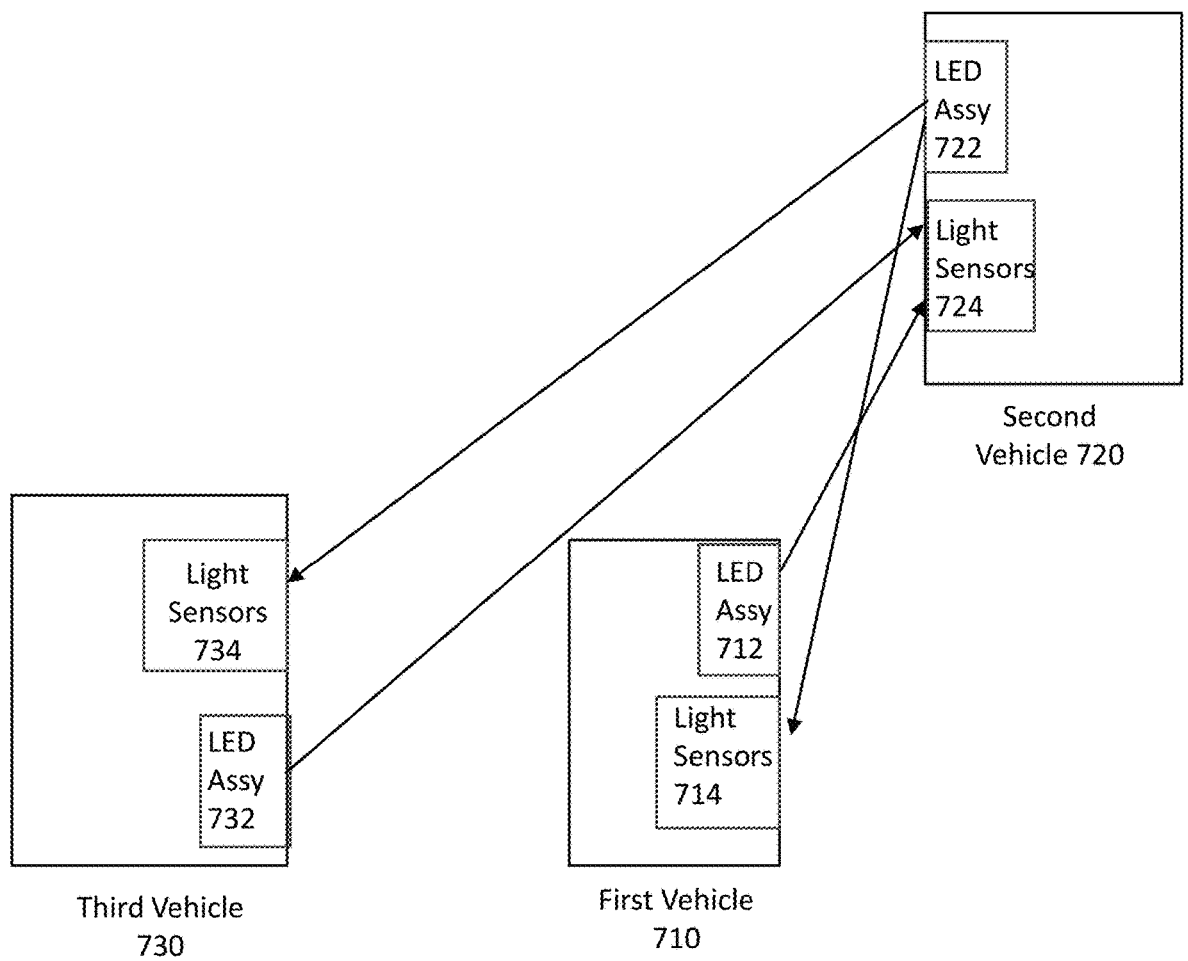
FIG. 7 illustrates a communication system between a first vehicle, a second vehicle and a third vehicle using a vehicle LED communication system according to some implementations.

For exemplary embodiments, the braking subsystem 405 may be communicatively coupled or connected to the vehicle processor controller 420. In some implementations, the braking subsystem 405 may be configured to control the brakes on all of wheels of the vehicle. The braking subsystem 405 may include memory devices, sensors, a controller and/or computer-readable instructions executable by the controller to receive instructions and perform operations identified by the instructions. In some implementations, the braking subsystem 405 may receive range and/or distance measurements or parameters from the vehicle lidar system 100 as illustrated in FIGS. 1-3 (and the associated description) or may communicate to or receive from one or more communication messages from other vehicles as described with respect to the LED vehicle communication system as illustrated in FIGS. 5-7 (and the associated description).

For exemplary embodiments, the steering subsystem 410 may be communicatively coupled or connected to the vehicle processor controller 420. In some implementations, the steering system may be configured to control the steering of the vehicle when in operation. The steering subsystem 410 may include memory devices, a controller, sensors, and/or computer-readable instructions executable by the controller to receive instructions and perform operations identified by the instructions. In some implementations, the steering subsystem 410 may receive range and/or distance measurements or parameters from the vehicle lidar system 100 as illustrated in FIGS. 1-3 (and the associated description) or may communicate to or receive from one or more communication messages from other vehicles as described with respect to the LED vehicle communication system as illustrated in FIGS. 5-7 (and the associated description).

For exemplary embodiments, the navigation subsystem 415 may be communicatively coupled or connected to the vehicle processor controller 420. In some implementations, the navigation subsystem 415 may be configured to provide directions to places of interest for the vehicle or driver or to provide the driver or vehicle with location information. The navigation subsystem 415 may include memory devices, sensors, a controller and/or computer-readable instructions executable by the controller to receive instructions and perform operations identified by the instructions. In some implementations, the navigation subsystem 415 may receive range and/or distance measurements or parameters from the vehicle lidar system 100 as illustrated in FIGS. 1-3 (and the associated description) or may communicate to or receive from one or more communication messages from other vehicles as described with respect to the LED vehicle communication system as illustrated in FIGS. 5-7 (and the associated description).

For exemplary embodiments, the audio subsystem 425 may be communicatively coupled or connected to the vehicle processor controller 420. In some implementations, the audio subsystem 425 may be configured to generate audible messages for drivers and/or passengers in the vehicle. The audio subsystem 425 may include memory devices, sensors, a controller and/or computer-readable instructions executable by the controller to receive instructions and perform operations identified by the instructions. In some implementations, the audio subsystem 425 may receive range and/or distance measurements or parameters from the vehicle lidar system 100 as illustrated in FIGS. 1-3 (and the associated description) or may communicate to or receive from one or more communication messages from other vehicles as described with respect to the LED vehicle communication system as illustrated in FIGS. 5-7 (and the associated description).

For exemplary embodiments, the self-driving subsystem 433 may be communicatively coupled or connected to the vehicle processor 420. In some implementations, the self-driving subsystem 433 may be configured to communicate and provide instructions to other subsystems in order for the vehicle to drive itself without human intervention. The self-driving subsystem 433 may include memory devices, sensors, a controller and/or computer-readable instructions executable by the controller to receive instructions and perform operations identified by the instructions. In some implementations, the self-driving subsystem 433 may receive range and/or distance measurements or parameters from the vehicle lidar system 100 as illustrated in FIGS. 1-3 (and the associated description) or may communicate to or receive from one or more communication messages from other vehicles as described with respect to the LED vehicle communication system as illustrated in FIGS. 5-7 (and the associated description).

For exemplary embodiments, the transmission subsystem 430 may be communicatively coupled or connected to the vehicle processor controller 420. In some implementations, the transmission subsystem 430 may be configured to control the gearing mechanisms in the vehicle in order to move the vehicle forward, backwards, etc. The transmission subsystem 430 may include memory devices, a controller, sensors, and/or computer-readable instructions executable by the controller to receive instructions and perform operations identified by the instructions. In some implementations, the transmission subsystem 430 may receive range and/or distance measurements or parameters from the vehicle lidar system 100 as illustrated in FIGS. 1-3 (and the associated description) or may communicate to or receive from one or more communication messages from other vehicles as described with respect to the LED vehicle communication system as illustrated in FIGS. 5-7 (and the associated description).

For exemplary embodiments, the display subsystem 435 may be communicatively coupled or connected to the vehicle processor controller 420. In some implementations, the display subsystem 435 may be configured to provide a user with displays of operational conditions of the vehicle (e.g., speed, revolutions per hour, temperature in vehicle, air conditioning status) as well as to generate and display messages to drivers or passengers in the vehicle. The display subsystem 435 may include memory devices, sensors, a controller and/or computer-readable instructions executable by the controller to receive instructions and perform operations identified by the instructions. In some implementations, the display subsystem 435 may receive range and/or distance measurements or parameters from the vehicle lidar system 100 as illustrated in FIGS. 1-3 (and the associated description) or may communicate to or receive from one or more communication messages from other vehicles as described with respect to the LED vehicle communication system as illustrated in FIGS. 5-7 (and the associated description).

FIG. 5 is a block diagram illustrating different components of an exemplary LED vehicle communication system between a first vehicle and a second vehicle, in accordance with an embodiment of the disclosure. With reference to FIG. 5, there is shown a block diagram 500 of a first vehicle 510 communicating with a second vehicle 520. With reference to FIG. 5, a first vehicle 510 includes an encoder assembly 505, a signal modulator 507, a vehicle LED driver assembly 509, a vehicle LED assembly 511, a power supply 506, one or more vehicle light sensors 513, a signal demodulator 515, a decoder assembly 517, a vehicle central controller/processor 519, and/or one or more vehicle subsystem software (APIs) application programming interfaces 523.

With reference to FIG. 5, the second vehicle 520 may include one or more vehicle light sensors 541, a signal demodulator 543, a decoder assembly 545, a vehicle LED driver assembly 549, a vehicle LED assembly 547, a power supply 548, a signal modulator 551, an encoder assembly 553, a vehicle central controller/processor 555, one or more memory devices 557, and/or one or more vehicle subsystem software (APIs) application programming interfaces 559.

In exemplary embodiments, a first vehicle main controller processor 519 may execute computer-readable instructions stored in the one or more memory devices 521 to control operations of the illustrated components in the first vehicle 510. In order to initiate a communication from the first vehicle 510 to the second vehicle 520, the computer-readable instructions may communicate one or more messages to the encoder assembly 505 in the first vehicle.

In exemplary embodiments, the encoder assembly 505 may be communicatively coupled and connected to the vehicle controller/processor 519 and/or a signal modulator 507. In some implementations, the one or more messages may be encoded by the encoder assembly 505 and may be communicated to the signal modulator 507.

In exemplary embodiments, the encoded one or more messages may be modulated by a signal modulator 507 to generate one or more encoded modulated messages.

In exemplary embodiments, the signal modulator 507 may be communicatively coupled to the vehicle LED driver assembly 509. In some implementations, a modulated LED data transmission signal may be generated by the vehicle LED driver assembly 509 based at least in part on the one or more encoded modulated messages.

In exemplary embodiments, the vehicle LED assembly 511 is communicatively coupled or connected to the vehicle LED driver assembly 509. In some implementations, the vehicle LED assembly 511 in the first vehicle 510 may be configured to generate a plurality of modulated light beams based on the received modulated LED data transmission signal. The plurality of modulated light beams may be transmitted in an outward direction from the first vehicle 510. In some implementations, the vehicle LED assembly 511 may be a vehicle LED headlight and the plurality of modulated light beams may be transmitted in an outward direction from a front of a first vehicle 510. In alternative implementations, the vehicle LED assembly 511 may be a vehicle LED taillight in the first vehicle 510 and the plurality of modulated light beams may be transmitted in an outward direction from a rear of a first vehicle 510.

In exemplary embodiments, a second vehicle 520 may receive the plurality of modulated light beams from the first vehicle LED assembly 511. In some implementations, one or more light sensors 541 in the second vehicle may detect the plurality of modulated light beams. The one or more light sensors 541 may detect an intensity of the plurality of modulated light beams.

In exemplary embodiments, the one or more light sensors 541 of the second vehicle may be configured to generate a modulated data transmission signal representative of the captured intensity of the plurality of modulated light beams.

In exemplary embodiments, the signal demodulator 543 in the second vehicle 520 may be communicatively coupled or connected to the one or more light sensors 541. In some implementations, the signal demodulator 543 in the second vehicle may be configured to receive the modulated data transmission signal from the one or more light sensors 541 and may generate a demodulated data transmission signal. The signal demodulator 543 may transmit the demodulated data transmission signal to the decoder assembly 545.

In exemplary embodiments, the decoder assembly 545 in the second vehicle 520 may be communicatively coupled to the signal demodulator 543 and/or the second vehicle central processor 555. In some implementations, the decoder assembly 545 in the second vehicle 520 may receive the demodulated data transmission signal and may generate a decoded data transmission signal. The decoded data transmission signal should be the same as or similar to the original one or more messages generated by the first vehicle's controller and/or processor 519.

In exemplary embodiments, the decoder assembly 545 may be communicatively coupled to the one or more memory devices 557 and/or the second vehicle central processor or controller 555. In some implementations, the decoder assembly 545 may be configured to communicate the decoded data transmission signal to be stored in the one or more memory devices 521. In some implementations, the second vehicle central processor or controller 555 may be configured to communicate the decoded data transmission signal to other vehicle subassemblies (as described in FIG. 4) of the second vehicle in order for the other vehicle subassemblies to perform action in response to the received decoded data transmission signal. As an illustrative example, the first vehicle 510 may be going in the opposite direction from the second vehicle 520 and may communicate one or more messages via the LED headlight 511 identifying that an accident has occurred in an area that the first vehicle 510 recently passed. The second vehicle 520 may receive the decoded data transmission signal and may communicate the decoded data transmission signal to the vehicle display subsystem 435 in the second vehicle 520 to display a message identifying an accident is up ahead and/or a vehicle audio subsystem 425 to create an audible message or sound to warn a driver of the second vehicle 520 there is an accident up ahead.

In some implementations, communications may flow both ways between the first vehicle 510 and 520. In some implementations, a first vehicle LED headlight 511 may communicate one or more modulated messages via a plurality of light beams which may be received as described immediately above. As an illustrative example, a first vehicle LED headlight 511 may communicate a message from a vehicle braking subsystem 405 that a tire is flat or that brakes are failing in order to warn the second vehicle 520 (who is travelling the same direction and behind the first vehicle 510) that the brakes or tire has failed. In some implementations, the second vehicle 520 may generate one or more messages indicating receipt of the error message and asking the first vehicle 510 if the first vehicle 510 may need any assistance. This scenario may be described with respect to FIG. 5 below.

In this example, computer-readable instructions 559 may be accessed from the one or more memory devices 557 and may be executable by the second vehicle central processor or controller 555 to receive one or more messages from one or more of the other vehicle subsystems to verify receipt and also to ask if the first vehicle 510 needs more assistance. In some implementations, the encoder assembly 553 of the second vehicle 520 may encode the one or more verification and/or assistance messages and may communicate the one or more encoded verification and/or assistance messages to a signal modulator 551. In some implementations, the signal modulator 551 of the second vehicle 520 may modulate the one or more encoded verification and/or assistance messages and create one or more encoded modulated verification and/or assistance messages. The signal modulator 551 may be configured to communicate the encoded modulated verification messages to the LED driver assembly 549 in the second vehicle 520. The LED driver assembly 549 may be configured to generate a modulated LED transmission response signal based at least in part on the received one or more encoded modulated verification/assistance messages. The LED driver assembly 549 in the second vehicle may be configured to communicate the modulated LED transmission response signal to the vehicle LED assembly 547. The vehicle LED assembly 547 in the second vehicle 520 may be configured to generate and transmit a plurality of response light beams based at least in part on the modulated LED transmission response signal.

In exemplary embodiments, one or more light sensors 513 on first vehicle 510 may be configured to detect an intensity of the plurality of response light beams transmitted from the second vehicle LED assembly 547. In some implementations, the one or more light sensors 513 in the first vehicle may be configured to generate a response data transmission signal representative of the detected intensity of the plurality of response light beams. The one or more light sensors 513 in the first vehicle may communicate the response data transmission signal to the signal demodulator 515 in the first vehicle 510.

In exemplary embodiments, the signal demodulator 515 in the first vehicle 510 may be configured to generate a demodulated response data transmission signal and communicate the demodulated response data transmission signal to the decoder assembly 517 in the first vehicle 510. The decoder assembly 517 may decode the demodulated response data transmission signal to create one or more decoded response messages. In some implementations, the one or more decoded response messages may be stored in one or more memory devices 521 of the first vehicle 510. In some implementations, computer-readable instructions 523 may be executable by the vehicle controller/processor 519 to process the decoded response messages and to communicate these decoded messages to an appropriate vehicle subsystem for actions.

In exemplary embodiments, the vehicle communication system 500 may include a synchronization module within the encoder assemblies 505 553. The synchronization module in the encoder assemblies 505 553 may be implemented in software, hardware and/or a combination thereof. In some implementations, a synchronization module in the encoder assemblies 505 553 may be configured to synchronize the one or more light sensors 513 and 541 and the one or more encoded messages generated by the encoding assemblies 505 553. In some implementations, the encoder assemblies 505 553 may utilize a code division multiple access (CDMA) protocol for synchronization. As an example, encoder assemblies 505 553 may assign one or more encoded messages a specific code, utilizing CDMA protocols. The one or more light sensors 513 541 may be configured to capture the plurality of reflected light beams that include the assigned specific code. The other reflected light beams may be discarded and not utilized. Stray light from other light sources such as other automobiles, street lights, natural light sources like the moon and the sun, for example, may be picked up by the one or more light sensors 513 541. However, utilizing CDMA filtering and protocols allows the vehicle communication system to filter out and utilize only the plurality of reflected light beams that are transmitted by the vehicles LED light assemblies 511 and 547. This technique improves an accuracy of the vehicle LED communication system 500.

In exemplary embodiments, the vehicle communication system 500 may further include filter modules 560 561. The filter modules 560 561 may be coupled or connected to the one or more light sensors 513 541. In some implementations, the signal modulators 507 551 may utilize one single frequency or a specific number of single frequencies when generating the modulation signal. The filter module 560 561 may receive the plurality of reflected light beams and may filter out any of the plurality of reflected light beams whose frequency is not the single frequency (or the other number of single frequencies) generated by the signal modulators 507 551. This also allows the vehicle communication system to filter out and only use the plurality of reflected light beams that are transmitted by the vehicle LED light assemblies 511 and 547. This also improves the accuracy of the vehicle LED communication system 500.

FIG. 6 is a flowchart that illustrates an exemplary method for utilizing a vehicle light emitting diode (LED) light assembly (e.g., a LED head light and tail light) for communications between a first vehicle and a second vehicle, in accordance with an embodiment of the disclosure. FIG. 6 is explained in conjunction with elements from FIGS. 4 and 5. With reference to FIG. 6, there is shown a flowchart 600 comprising exemplary operations 605 to 640.

In an exemplary embodiment, one vehicle (or an operator thereof) may desire to communicate information and data to a second vehicle (or an operator thereof). In some implementations, in situations where cellular networks and/or other wireless networks are inoperable due to failure, maintenance and/or weather, one vehicle may need an additional method and/or system for automatic or and/or timely communication of information and data. This is an important application of the LED light assembly vehicle communication system 500 during emergency situations when no other method of communication is available.

A vehicle or operator may generate one or more messages to communicate to another vehicle. These messages may include vehicle speed information, vehicle operation information (e.g., are parts malfunctioning), and/or emergency alert information. At 605, one or more messages may be received and may be encoded to generate one or more encoded messages at an encoder assembly 505.

In exemplary embodiments, a signal modulator 507 may receive the encoded one or more messages. At 610, a signal modulator 507 may generate a modulated encoded signal based on the encoded one or more messages. The signal modulator may communicate the modulated encoded signal to the LED driver module 509.

At 615, a modulated LED transmission signal may be generated by the LED driver module 509 based on the modulated encoded signal. The modulated LED transmission signal may be representative of the encoded one or more messages. In some implementations, the modulated LED transmission signal may modulate an intensity of a plurality of light beams.

The vehicle LED light assembly 511 may receive the modulated LED transmission signal from the LED driver module 509. At step 620, in an exemplary embodiment, a plurality of light beams may be transmitted, utilizing an vehicle LED light assembly 511, based at least in part on the generated modulated LED data transmission signal.

In exemplary embodiments, a second vehicle 520 may receive the plurality of light beams transmitted by the first vehicle 510. In some implementations, the LED light assembly 511 of the first vehicle 510 may be a LED headlight. In this implementation, if the second vehicle 520 is traveling a same direction as the first vehicle 510, one or more receiving light sensors 541 may be located on a back portion of the vehicle (e.g., a vehicle rear bumper). In some implementations, if a second vehicle 520 is traveling an opposite direction as compared to a first vehicle 510, one or more receiving light sensors may be located on a front portion of the vehicle, (e.g., a vehicle front bumper). In some implementations, the LED light assembly 511 of the first vehicle may be an LED taillight. In this implementation, if the second vehicle 520 is traveling a same direction as the first vehicle 510, one or more receiving light sensors 541 may be located on a front portion of the second vehicle 520 (e.g., the second vehicle front bumper). In this implementation, if the second vehicle 520 is travelling an opposite direction from the first vehicle 510, one or more receiving light sensors 541 may be located on a back portion of the second vehicle 520 (e.g., the second vehicle rear bumper).

At step 625, an intensity of the transmitted plurality of light beams transmitted from the first vehicle 510 may be detected by a second vehicle 520, by one or more light sensors 541 positioned on the second vehicle 520. In some implementations, in step 630, the plurality of light sensors 541 may generate a data transmission signal representative of the detected light intensity measurements. In some implementations, the one or more light sensors 541 may communicate the data transmission signal to a demodulator 543.

In exemplary embodiments, the demodulator 543 may receive the data transmission signal. At step 635, the data transmission signal may be demodulated by the demodulator 543 to create a demodulated data transmission signal. In some implementations, the demodulator 543 may transmit the demodulated data transmission signal to the decoder assembly 545.

In exemplary embodiments, the decoder assembly 545 may receive the demodulated data transmission signal. At step 640, the demodulated data transmission signal may be decoded, by the decoder assembly 545, and one or more decoded messages may be created. The one or more decoded messages should be the same or very similar to the generated one or more messages transmitted to the first vehicle's encoder 505 in step 605.

In some implementations, the one or more decoded messages may be stored in one or more memory devices 557 of the second vehicle 520. In some implementations, software instructions 559 stored in the one or more memory devices 557 may be executable by the second vehicle central processors 555 to communicate the one or more decoded messages to other vehicle subsystems of the second vehicle 520.

FIG. 7 illustrates a communication system between a first vehicle, a second vehicle and a third vehicle using a vehicle LED communication system according to some implementations. In exemplary embodiments, the communication system 700 may be utilized in an area where no other communication networks are present (e.g., because of remoteness or due to a communication network that is inoperable). The communication system 700 may include a first vehicle 710, a second vehicle 720, and a third vehicle 730. In some implementations, the first vehicle 710 may have one or more LED assemblies 712 and one or more light sensors 714. In some implementations, the second vehicle 720 may have one or more LED assemblies 722 and one or more light sensors 724. In some implementations, the third vehicle 730 may have one or more LED assemblies 732 and/or one or more light sensors 734. In some implementations, the second vehicle 720 may act as a communication intermediary between the first vehicle 710 and the third vehicle 730, although in other embodiments, all three vehicles 710, 720 and 730 may be communicatively coupled. The encoding and modulating of the one or more messages and the generating of the plurality of modulated light beams for FIG. 7 follows the same methods and apparatus as described in FIGS. 5 and 6. Similarly, the receiving of the modulated light beams, the demodulating of the light beams and the decoding for FIG. 7 follows the same methods and apparatus as described in FIGS. 5 and 6. These operations are not repeated for FIG. 7 for simplicity. As an illustrative example, in some implementations, the first vehicle 710 may communicate one or more encoded messages through a plurality of modulated light beams generated by the first vehicle one or more LED assemblies 712. In some implementations, the one or more light sensors 724 of the second vehicle 720 may receive the plurality of modulated light beams and decode the one or more messages from the first vehicle 710. In some implementations, if the second vehicle 720 is utilized as an intermediary communication vehicle, then the second vehicle may encode the received one or more messages and transmit an intermediary plurality of modulated light beams from the one or more second vehicle LED light assemblies 722 based on the encoded messages. In some implementations, the one or more light sensors 734 of the third vehicle 730 may receive the transmitted intermediary plurality of modulated light beams from the second vehicle and decode the one or more messages. The third vehicle 730 may analyze the received decoded one or more messages and may generate one or more response messages designated for the first vehicle 710. In some implementations, the one or more LED assemblies 732 of the third vehicle 730 may generate and transmit a plurality of response modulated beams based on the one or more response message. In these implementations, the one or more light sensors 724 of the second vehicle 720 may receive the plurality of response modulated beams and the second vehicle 720 may decode the one or more response messages. The second vehicle 720 may encode one or more response intermediary messages. The one or more vehicle LED assemblies 722 of the second vehicle 720 may generate and transmit a plurality of intermediary response light beams. In some implementations, one or more light sensors 714 of the first vehicle may receive the plurality of intermediary response light beams and the first vehicle 710 may decode and analyze the one or more response intermediary messages. In these embodiments, if a vehicle LED taillight is transmitting or communicating the plurality of modulated light beams (e.g., if the first vehicle LED assembly 712 is transmitting through a LED taillight), the receiving vehicle may include a filter module before the one or more light sensors. The filter module may accept and receive only the red colored plurality of light beams and filter out other light beams (e.g., the second vehicle one or more light sensors 724 may include a filter module to accept only the red light from the first vehicle LED assembly 712 in the taillight and to reject all other light beams such as headlight beams from approaching vehicles). The methods described above is available in environments where there is no communication network service, such as in emergency weather situations like the aftermath of a hurricane or earthquake. The subject matter described herein allows vehicles to communicate with each other even if other communication networks are down. The methods described herein also allow for fast, low-latency communications which are important when emergency situations arise and vehicle actions need to be taken quickly. These methods also allow for two or more vehicles to communicate secretly in what appears to be normal vehicle operation and not alert another party or vehicle that vehicle-to-vehicle communications are taking place.

Figure 8A:
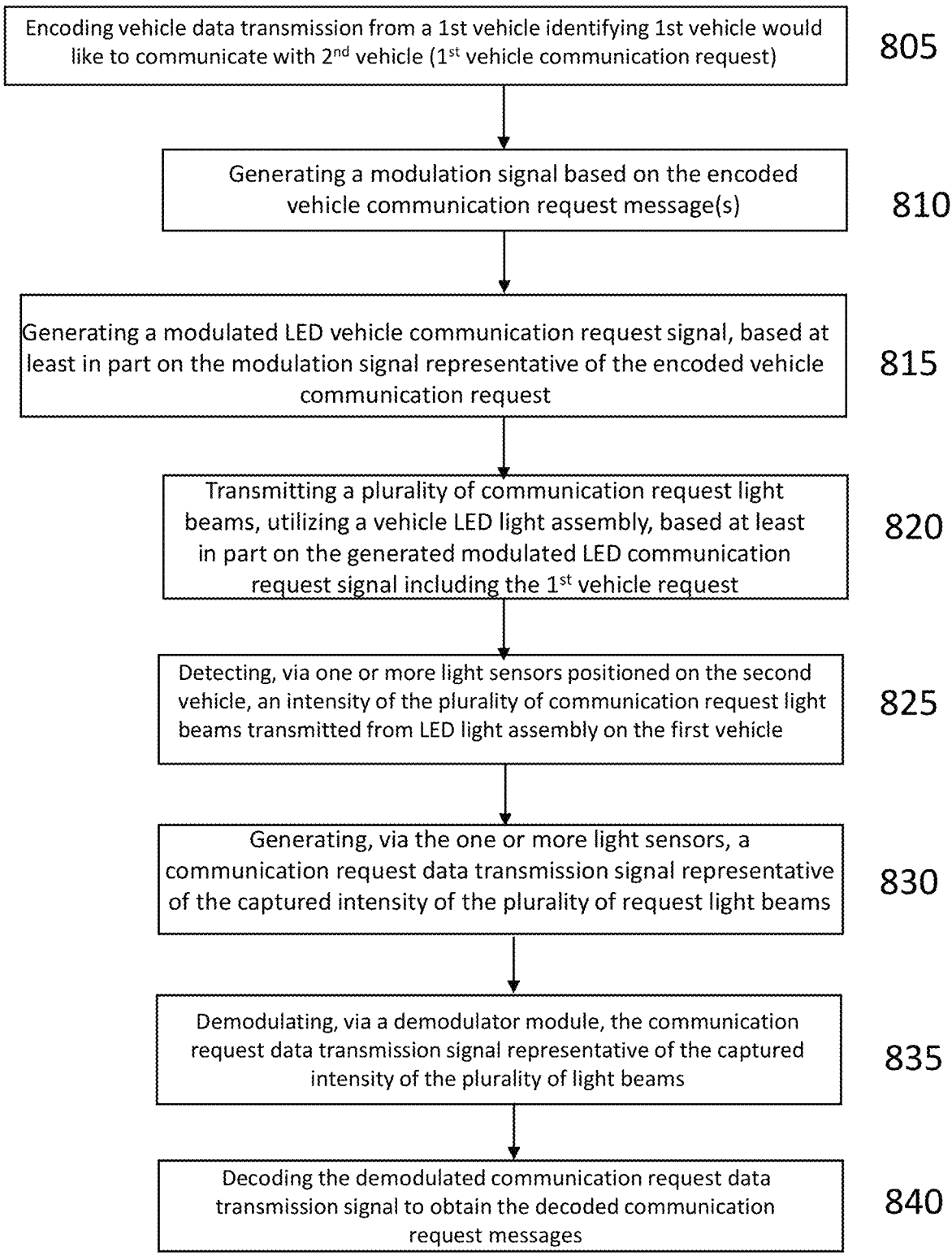
FIG. 8A illustrates two or more vehicles attempting to engage in conversations or communications with each other according to exemplary embodiments.
Figure 8B:
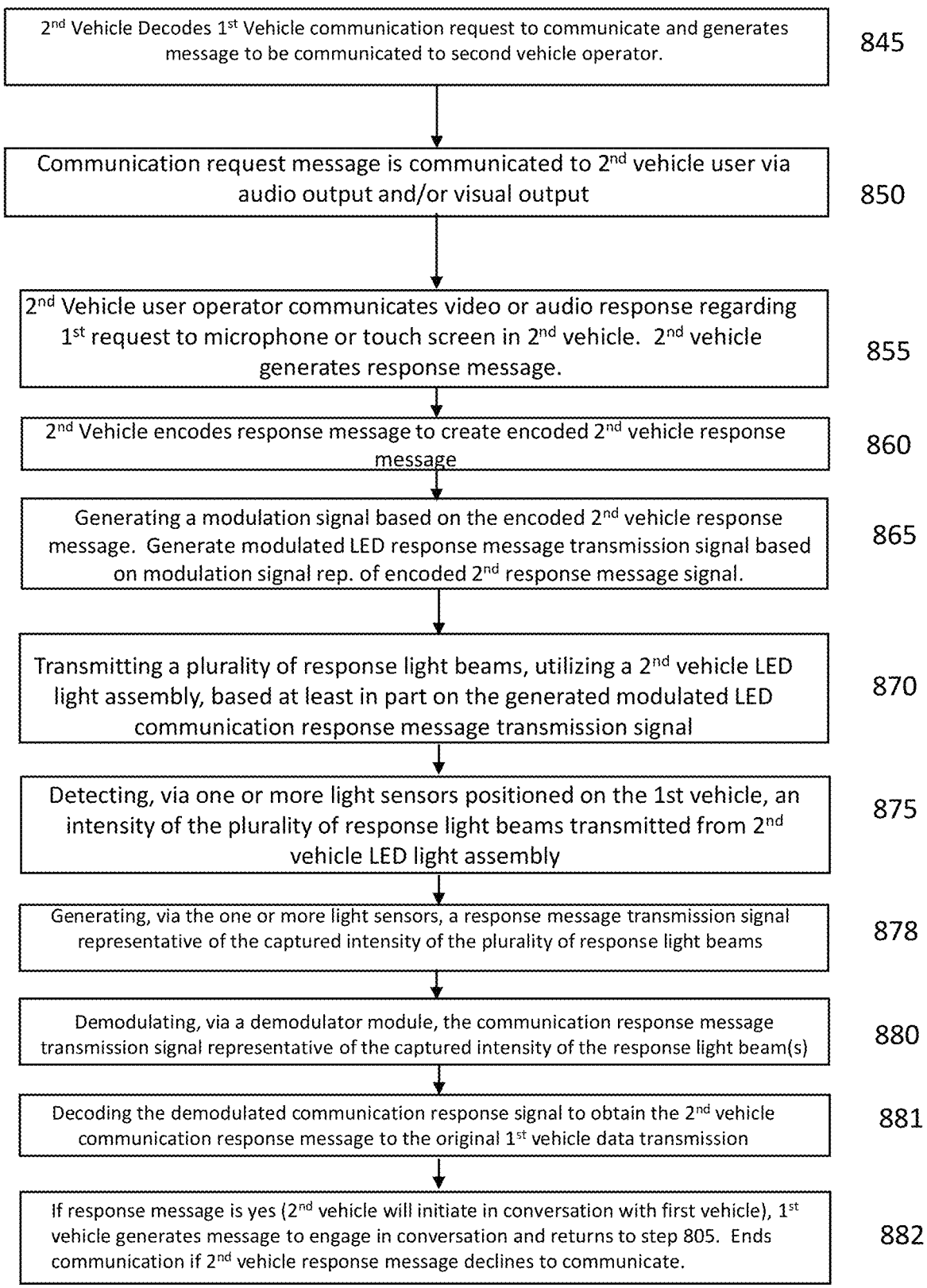
FIG. 8B illustrates two or more vehicles attempting to engage in conversations or communications with each other according to exemplary embodiments.

FIGS. 8A AND 8B illustrate two or more vehicles attempting to engage in conversations or communications with each other according to exemplary embodiments. In exemplary embodiments, an operator of a first vehicle may wish to engage in a conversation with an operator in a second vehicle. This may be because the first vehicle operator knows the second vehicle operator, the first vehicle operator and the second vehicle operator have things in common (e.g., they are driving the same vehicle or have the same bumper sticker), or the first vehicle operator would like to meet the second vehicle operator. Rather than honking or waving (which can be distracting to the other vehicle operator or driver or other vehicles), the first vehicle operator may attempt to communicate with the other vehicle operator wirelessly and/or utilizing existing components of the automobile, such as headlights or taillights). The description below describes LED headlight communication but other forms of light communication technology (e.g., laser) or wireless communication may be utilized to attempt and establish communications and/or conversations between at least two vehicle operators.

At 805, one or more communication request messages may be received and may be encoded to generate one or more encoded communication request messages at an encoder assembly 505. The communication request messages may be generated by a social media application utilized by a first vehicle operator (e.g., a DM message, a friend request, etc.) or by a speech-to-text software application utilized by the vehicle to convert operator's commands or voice to text files.

In exemplary embodiments, a signal modulator 507 may receive the encoded one or more encoded communication request messages. At 810, a signal modulator 507 may generate a modulated encoded signal based on the encoded one or more communication request messages. The signal modulator may communicate the modulated encoded signal to the LED driver module 509.

At 815, a modulated communication request LED transmission signal may be generated by the LED driver module 509 based on the modulated encoded signal. The modulated communication request LED transmission signal may be representative of the encoded one or more communication request messages. In some implementations, the modulated communication request LED transmission signal may modulate an intensity of a plurality of light beams.

The vehicle LED light assembly 511 may receive the modulated LED communication request transmission signal from the LED driver module 509. At step 820, in an exemplary embodiment, a plurality of communication request light beams may be transmitted, utilizing a vehicle LED light assembly 511, based at least in part on the generated modulated communication request LED data transmission signal.

In exemplary embodiments, a second vehicle 520 may receive the plurality of communication request light beams transmitted by the first vehicle 510. In some implementations, the LED light assembly 511 of the first vehicle 510 may be a LED headlight. In this implementation, if the second vehicle 520 is traveling a same direction as the first vehicle 510, one or more receiving light sensors 541 may be located on a back portion of the vehicle (e.g., a vehicle rear bumper). In some implementations, if a second vehicle 520 is traveling an opposite direction as compared to a first vehicle 510, one or more receiving light sensors may be located on a front portion of the vehicle, (e.g., a vehicle front bumper). In some implementations, the LED light assembly 511 of the first vehicle may be an LED taillight. In this implementation, if the second vehicle 520 is traveling a same direction as the first vehicle 510, one or more receiving light sensors 541 may be located on a front portion of the second vehicle 520 (e.g., the second vehicle front bumper). In this implementation, if the second vehicle 520 is travelling an opposite direction from the first vehicle 510, one or more receiving light sensors 541 may be located on a back portion of the second vehicle 520 (e.g., the second vehicle rear bumper).

At step 825, an intensity of the transmitted plurality of communication request light beams transmitted from the first vehicle 510 may be detected by a second vehicle 520, by one or more light sensors 541 positioned on the second vehicle 520. In some implementations, in step 830, the plurality of light sensors 541 may generate a communication request data transmission signal representative of the detected light intensity measurements. In some implementations, the one or more light sensors 541 may communicate the communication request data transmission signal to a demodulator 543.

In exemplary embodiments, the demodulator 543 may receive the communication request data transmission signal. At step 835, the communication request data transmission signal may be demodulated by the demodulator 543 to create a demodulated communication request data transmission signal. In some implementations, the demodulator 543 may transmit the demodulated communication request data transmission signal to the decoder assembly 545.

In exemplary embodiments, the decoder assembly 545 may receive the demodulated communication request data transmission signal. At step 840, the demodulated communication request data transmission signal may be decoded, by the decoder assembly 545, and one or more decoded communication request messages may be created. The one or more decoded communication request messages should be the same or very similar to the generated one or more communication request messages transmitted to the first vehicle's encoder 505 in step 805.

In exemplary embodiments, at step 845, software applications (e.g., computer-readable instructions) 559 may be executable by the second vehicle central processor(s) 555 to receive and/or analyze the decoded communication request messages. In exemplary embodiments, at step 850, the decoded communication request messages may be communicated to the second vehicle operator via a vehicle audio device and/or a vehicle display device. The second vehicle operator may then decide whether or not to respond to the first vehicle operator's communication request.

At step 855, in exemplary embodiments, the second vehicle operator may communicate an audio or video response to one or more vehicle microphones and/or imaging device (or via a touch input to a vehicle touch screen) and one or more communication response messages may be generated.

At step 860, in exemplary embodiments, the communication response message(s) may be communicated to a second vehicle encoder 553 and one or more encoded communication response messages may be generated.

At step 865, in exemplary embodiments, a signal modulator 551 may receive the encoded one or more communication response messages and the signal modulator 551 may generate a modulated encoded response signal based on the encoded one or more communication response messages. The signal modulator may communicate the modulated encoded communication response signal to the LED driver module 549. In exemplary embodiments, a modulated communication response LED transmission signal may be generated by the LED driver module 549 based on the modulated encoded response signal. The modulated communication response LED transmission signal may be representative of the encoded one or more communication response messages. In some implementations, the modulated LED transmission signal may modulate an intensity of a plurality of response light beams.

In exemplary embodiment, the vehicle LED light assembly 547 may receive the modulated LED communication response transmission signal from the LED driver module 549. At step 870, in an exemplary embodiment, a plurality of communication response light beams may be transmitted, utilizing a vehicle LED light assembly 547, based at least in part on the generated modulated communication response LED data transmission signal.

At step 875, an intensity of the transmitted plurality of communication response light beams transmitted from the second vehicle 520 may be detected by a first vehicle 510, by one or more light sensors 513 positioned on the first vehicle 510. In some implementations, in step 878, the plurality of light sensors 513 may generate a communication response data transmission signal representative of the detected light intensity measurements. In some implementations, the one or more light sensors 513 may communicate the communication response data transmission signal to a demodulator 515.

In exemplary embodiments, the demodulator 515 may receive the communication response data transmission signal. At step 880, the communication response data transmission signal may be demodulated by the demodulator 515 to create a demodulated communication response data transmission signal. In some implementations, the demodulator 515 may transmit the demodulated communication request data transmission signal to the decoder assembly 517.

In exemplary embodiments, the decoder assembly 517 may receive the demodulated communication response data transmission signal. At step 881, the demodulated communication response data transmission signal may be decoded, by the decoder assembly 517, and one or more decoded communication response messages may be created. The one or more decoded communication response messages may identify whether the second vehicle operator would like to engage in conversations or communication with the first vehicle operator. For example, response messages could be no, no not at this time but maybe later, yes, or yes, but wait a few minutes.

In exemplary embodiments, at step 882, software applications (e.g., computer-readable instructions) executable by the one or more first vehicle processor or controllers) may receive the one or more communication response messages from the decoder assembly and may present the one or more communication response messages to the first vehicle operator via an audio device, a touch screen and/or a display device. If the one or more communication response messages are affirmative (e.g., the second vehicle operator may wish to communicate with the first vehicle operator), the first vehicle response operator may generate one or more communication initiating messages (e.g., audibly or via a touch screen) and the process may return to step 805 in order to continue the conversation. If the one or more communication response messages are negative, the communication between the two vehicles may be ended. In exemplary emboiments, the application software may identify that the vehicle who with user communicated with is not interested in communicating with the first vehicle.

In exemplary embodiments, the process described immediately above may be utilized by the first vehicle to communicate or attempt to communicate with a plurality of vehicles (e.g., two or more vehicles). In other words, the first vehicle's communication request message may be communicated via the first vehicle's LED assembly and one or more light sensors on multiple vehicles may detect the plurality of light beams generated via the first vehicle's LED assembly. Each of the multiple vehicles may then go through the process described in FIG. 8B to determine whether to respond to the first vehicle's operator and if so what to include.

Figure 8C:
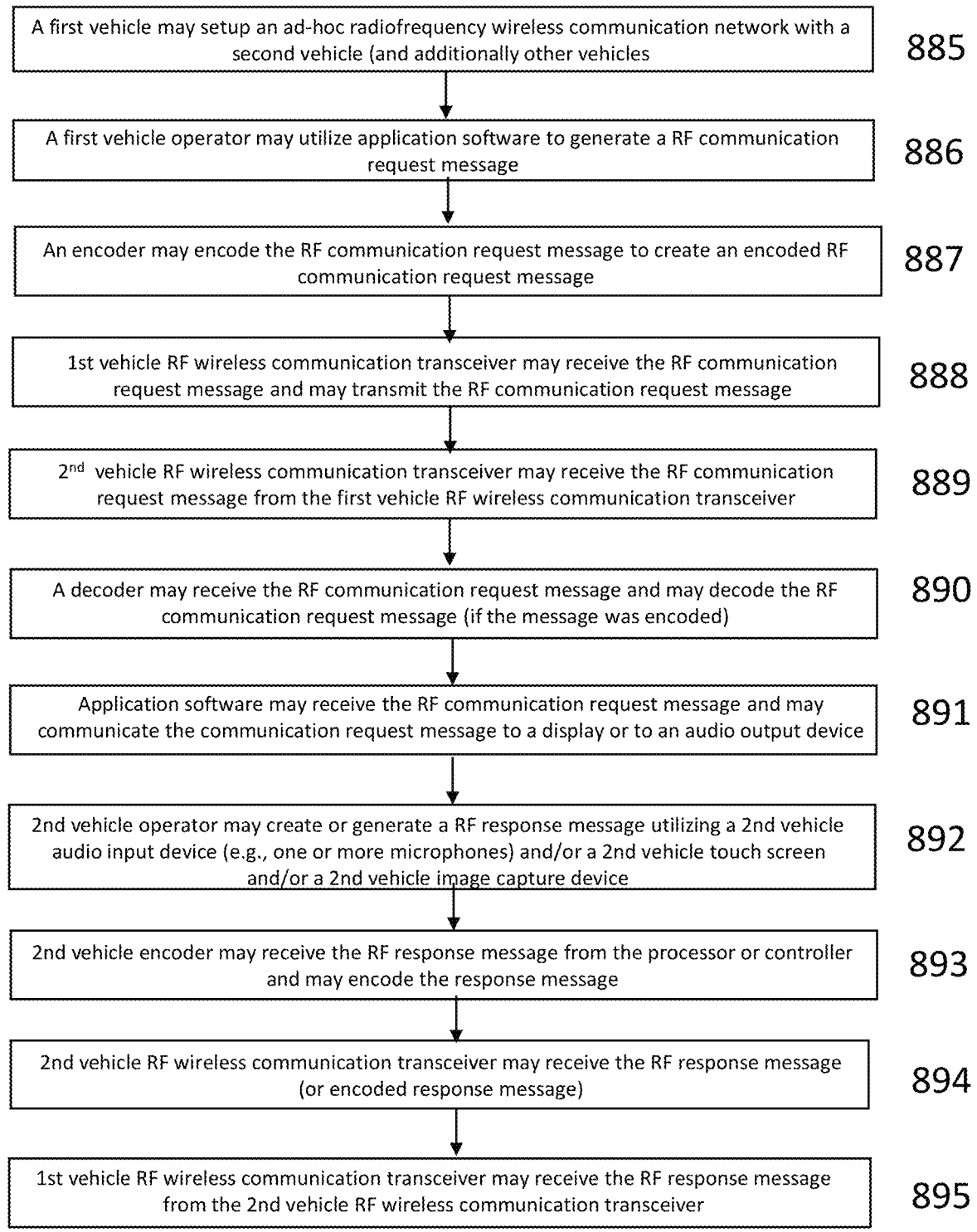
FIG. 8C illustrates a process for communications between a first vehicle and a second vehicle according to exemplary embodiments.
Figure 8D:
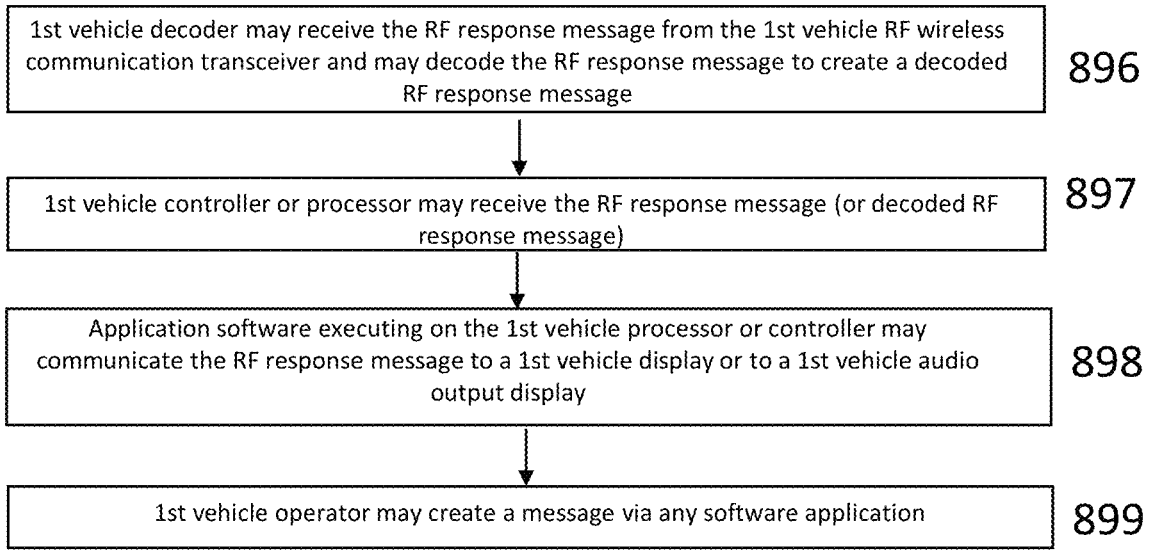
FIG. 8D illustrates a process for communications between a first vehicle and a second vehicle according to exemplary embodiments.

FIGS. 8C and 8D illustrates a process for communications between a first vehicle and a second vehicle according to exemplary embodiments. In exemplary embodiments, a first vehicle operator may request to communicate with a second vehicle operator through an ad-hoc RF wireless communication network. In these embodiments, light-based communication may not be possible or desirable as a communication medium for the two vehicles. In these embodiments, cellular wireless communication may not be possible or desirable. In exemplary embodiments, the ad hoc RF wireless communication may be made utilizing a Thread protocol, a Matter protocol, a Zigbee protocol, and/or a Bluetooth protocol. In exemplary embodiments, at step 885, a first vehicle may setup an ad-hoc radiofrequency wireless communication network with a second vehicle (and additionally other vehicles). In exemplary embodiments, at step 886, a first vehicle operator may utilize application software to generate a RF communication request message. In other words, computer-readable instructions may be executable by a first vehicle processor or controller may generate a RF communication request message. In some exemplary embodiments, in step 887, an encoder may encode the RF communication request message to create an encoded RF communication request message and communicate the encoded RF communication request message. In exemplary embodiments, in step 888, a first vehicle RF wireless communication transceiver may receive the RF communication request message and may transmit the RF communication request message. In exemplary embodiments, in step 889, a second vehicle RF wireless communication transceiver may receive the RF communication request message from the first vehicle RF wireless communication transceiver. In some exemplary embodiments, in step 890, a decoder may receive the RF communication request message and may decode the RF communication request message (if the message was encoded) and may communicate the decoded RF communication request message. In exemplary embodiments, in step 891, application software (e.g., computer-readable instructions executable by one or more controllers or processors) may receive the RF communication request message and may communicate the communication request message to a display (for visual presentation to a second vehicle operator) or to an audio output device (for audible presentation to a second vehicle operator). The second vehicle operator may then decide whether or not to respond to the RF communication request message. If the second vehicle operator wants to communicate with the first vehicle operator, at step 892, the second vehicle operator may create or generate a RF response message utilizing a second vehicle audio input device (e.g., one or more microphones) and/or a second vehicle touch screen and/or a second vehicle image capture device (e.g., a camera).

In some exemplary embodiments, at step 893, a second vehicle encoder may receive the RF response message from the processor or controller and may encode the response message. In exemplary embodiments, at step 894, the second vehicle RF wireless communication transceiver may receive the RF response message (or encoded response message) and may transmit the RF response message. In exemplary embodiments, at step 895, the first vehicle RF wireless communication transceiver may receive the RF response message from the second vehicle RF wireless communication transceiver. In some exemplary embodiments, at step 896, the first vehicle decoder may receive the RF response message from the first vehicle RF wireless communication transceiver and may decode the RF response message to create a decoded RF response message. In some exemplary embodiments, at step 897, the first vehicle controller or processor may receive the RF response message (or decoded RF response message). In some exemplary embodiments, at step 898, application software executing on the first vehicle processor or controller may communicate the RF response message to a first vehicle display (to present contents of the message visually) or to a first vehicle audio output display (to present contents of the message audibly). At this point, the first vehicle operator may find out if the second vehicle operator (or other vehicle operators) want to engage in communications with the first vehicle operator. If there is a positive response, at step 899, the first vehicle operator may create a message via any software application and communicate with the positively responding second vehicle operator via the process described in FIGS. 8C and 8D.

Figure 9:
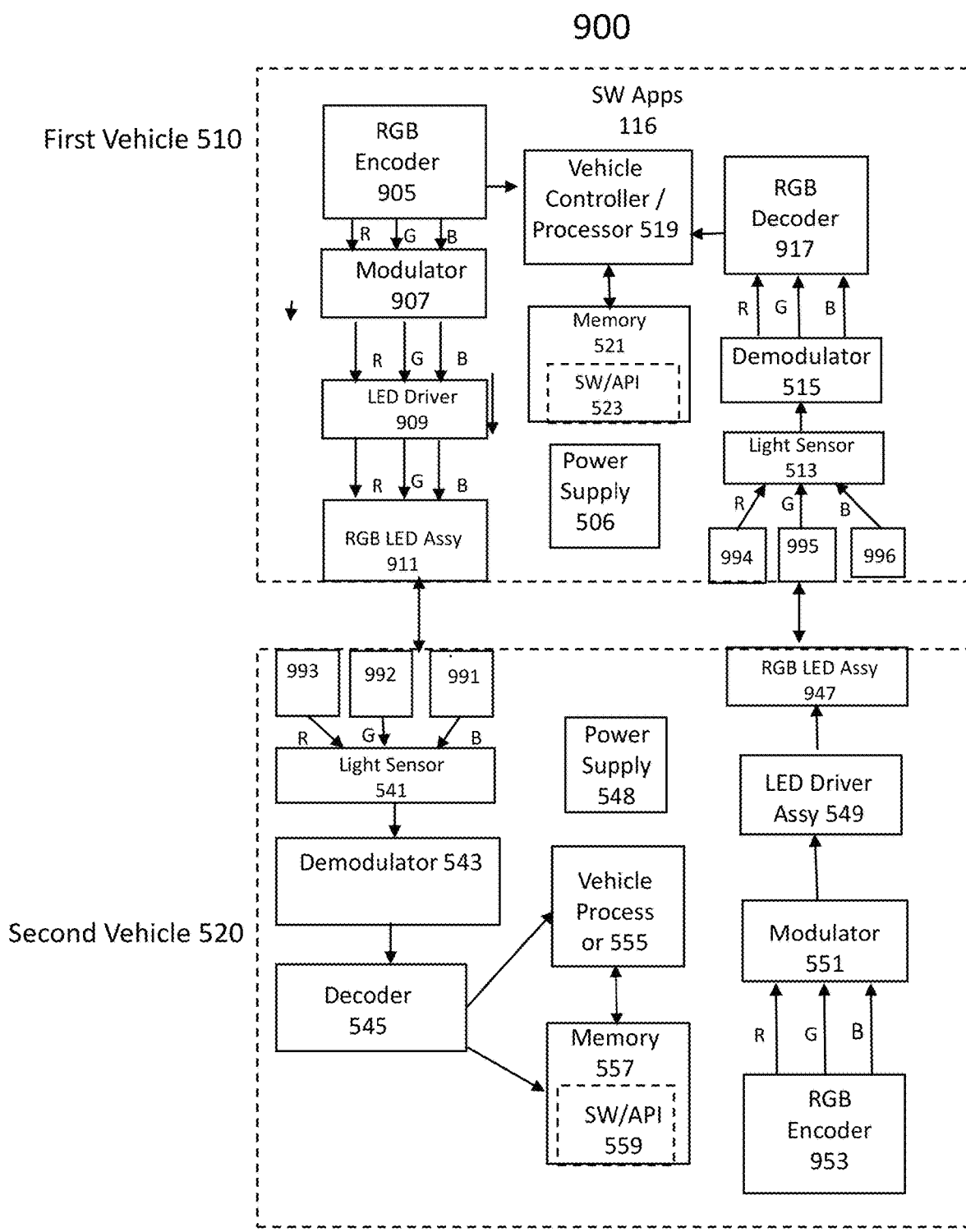
FIG. 9 illustrates a system for communicating utilizing color-based wavelength division multiplexing according to exemplary embodiments.

FIG. 9 illustrates a system for communicating utilizing color-based wavelength division multiplexing according to exemplary embodiments. In exemplary embodiments, the light-based communication system described herein can be further improved by assigning different data streams to different wavelengths (or colors increasing bandwidth of light) and utilizing a LED light assembly that transmits each of the different beams of light (e.g., which may include multiplexing the different light beam colors). As an example, a specific set of data may correspond to a plurality of red light beams, a second set of data may correspond to a plurality of green light beams and a third set of data may correspond to a plurality of blue light beams. In this implementation, the LED light assembly may be a red-green-blue LED light assembly In this implementation, the data throughput for the embodiment described herein may be tripled by utilizing red, green and blue light.

The improved light-based communication system may include a first vehicle 510 and a second vehicle 520. In exemplary embodiments, the first vehicle 510 may include a vehicle processor or controller 519, a memory 521 with computer-readable instructions 523 stored therein, a power supply 506, an RGB encoder 905, a modulator 907, a LED driver 909, and/or a RGB LED assembly 911. In exemplary embodiments, the first vehicle may further include a RGB decoder 917, a demodulator 515, one or more light sensors 513, and/or a red light filter 994, a green light filter 995 and/or a blue light filter 996. In exemplary embodiments, the second vehicle 520 may include a red light filter 993, a green light filter 992, a blue light filter 991, one or more light sensors 541, a demodulator 543, a RGB decoder 945, a power supply 548, a vehicle processor or controller 555, one or more memory devices 557 with computer-readable instructions 559 stored therein, a RGB encoder 953, a modulator 551, a LED driver assembly 549 and/or a RGB LED assembly 949.

In exemplary embodiments, a RGB encoder 905 in a first vehicle may receive data and/or messages to be communicated to a second vehicle. In exemplary embodiments, the RGB encoder 905 may be communicatively coupled to a first vehicle processor or controller 519 and may receive the data and/or messages from the first vehicle processor or controller 519. In exemplary embodiments, the RGB encoder 905 may be communicatively coupled or connected to a modulator 907. In exemplary embodiments, the RGB encoder may receive a plurality of data streams. In the implementation highlighted in FIG. 9, the RGB encoder 905 may receive three data streams where the three data streams include three unique sets of data. In exemplary embodiments, the RGB encoder 905 may encode a first data stream and associate the first data stream with a red color; may encode a second data stream and associate the second data stream with a green color; and may encode a third data stream with a blue color. In other words, the first RGB encoder 905 may generate a first vehicle red data transmission, a first vehicle blue data transmission, and a first vehicle green data transmission for the first vehicle. The first vehicle red data transmission, a first vehicle blue data transmission, and a first vehicle green data transmission from the first vehicle may be referred to as the first vehicle data transmissions or original data transmissions. In exemplary embodiments, the modulator 907 may be communicatively coupled or connected to the LED driver assembly or module 909. In exemplary embodiments, the modulator 907 may generate a modulation signal based on the first vehicle data transmissions.

In exemplary embodiments, the vehicle LED driver module 909 may generate and transmit a modulated red LED data transmission signal, a modulated blue LED data transmission signal and/or a modulated green LED data transmission signal. In exemplary embodiments, the vehicle LED driver module 909 may be communicatively coupled and/or connected to a RGB LED assembly 911. The modulation is utilized to modulate an intensity of the plurality of red light beams, modulate an intensity of a plurality of blue light beams, and modulate an intensity of a plurality of green light beams. In exemplary embodiments, the RGB LED assembly 911 may receive the modulated red LED data transmission signal, the modulated blue LED data transmission signal and/or the modulated green LED data transmission signal. In exemplary embodiments, the RGB LED assembly 911 may be based on these signals and may generate and/or emit a plurality of red light beams, a plurality of blue light beams, and a plurality of green light beams. In some implementations, the plurality of red light beams, the plurality of blue light beams and the plurality of green light beams may form a plurality of composite light beams. In some implementations, the plurality of composite light beams may be based at least in part on the associated modulated LED data transmission signals. In specific embodiments, the RGB LED light assembly 911 may be a tail light on a back of the first vehicle. In other embodiments, the RGB LED light assembly 911 may be a head light on a front of the first vehicle.

In exemplary embodiments, the second vehicle may receive the plurality of composite light beams from the RGB light assembly on the first vehicle. In exemplary embodiments, a red light wavelength filter 993 may receive the plurality of composite light beams and extract or filter the plurality of red light beams so that the one or more light sensors 541 receives the plurality of red light beams separately. Similarly, a green light wavelength filter 992 may receive the plurality of composite light beams and extract of filter the plurality of green light beams so that the one or more light sensors 541 receives the plurality of green light beams separately and a blue light wavelength filter 991 may receive the plurality of composite light beams and extract or filter the plurality of blue light beams so that the one or more light sensors 541 receives the plurality of green light beams separately.

In exemplary embodiments, the one or more light sensors 541 may generate a red data transmission signal representative of the captured intensity of the plurality of red light beams. In exemplary embodiments, the one or more light sensors 541 may generate a green data transmission signal representative of the captured intensity of the plurality of green light beams. In exemplary embodiments, the one or more light sensors 541 may generate a blue data transmission signal representative of the captured intensity of the plurality of blue light beams.

The demodulator module 543 may be communicatively coupled or connected to the one or more light sensors 541. In exemplary embodiments, a demodulator module may demodulate the red data transmission signal, the green data transmission signal and the blue data transmission signal representative of the captured intensity of the plurality of light beams and may generate associated demodulated red data transmission signals, demodulated green data transmission signals and demodulated blue data transmission signals.

In exemplary embodiments, the RGB decoder 545 may be communicatively coupled and/or connected to the demodulator module 543, the one or more vehicle processors or controllers 555 and/or the one or more memory devices 557. In exemplary embodiments, the RGB decoder 545 may decode the demodulated red data transmission signal to obtain the original first vehicle red data transmission; decode the demodulated green data transmission signal to obtain the original first vehicle green data transmission; and decode the demodulated blue data transmission signal to obtain the original first vehicle blue data transmission. In exemplary embodiments, the RGB decoder 545 may store the original first vehicle red data transmission, the original first vehicle green data transmission, and the original first vehicle blue data transmission in one or more memory the one or more memory devices.

In exemplary embodiments, application software or vehicle software 559 (executable by the one or more vehicle processors or controllers 555) may utilize the different data streams (e.g., the original first vehicle red data transmission, the original first vehicle green data transmission, and original first vehicle blue data transmission) for different purposes (e.g., one data stream may be for navigation instructions or data, another data stream may be for communicating vehicle operation status, and a different data stream may be for communication between a first vehicle operator and a second vehicle operator. In other words, the original first vehicle red data transmission may include information regarding a first subject matter, the original first vehicle green data transmission may include information regarding a second subject matter, and the original first vehicle blue data transmission may include a communication message between a first vehicle operator and a second vehicle operator. This additional improvement enhances an already novel process of communication between the two vehicles. Now, multiple data streams can be simultaneously transmitted between the two vehicles which may allow for multiple operational aspects to be shared.

Figure 10:
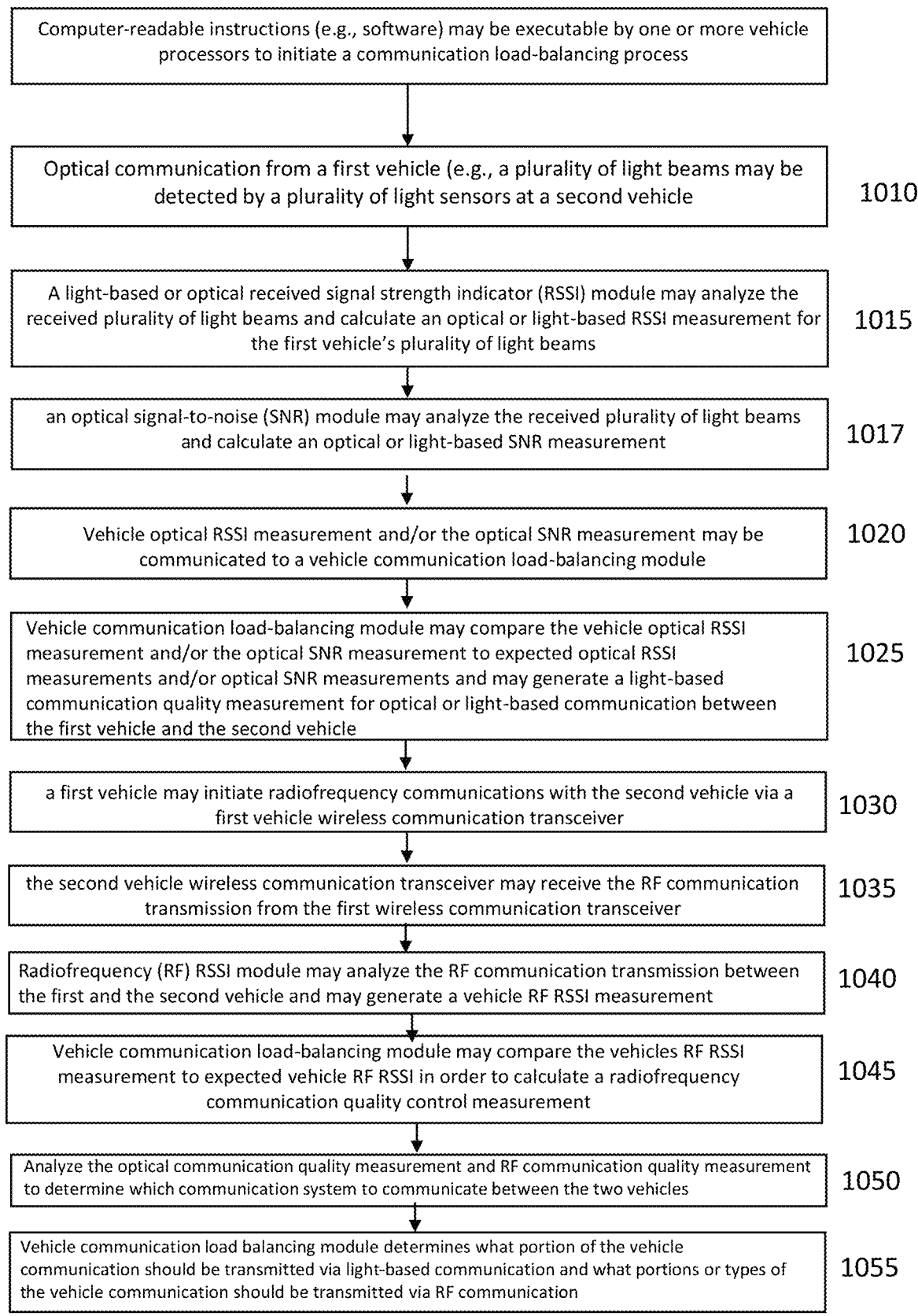
FIG. 10 illustrates a flowchart for load balancing between wireless radiofrequency communication networks and light-based communication networks according to exemplary embodiments.

FIG. 10 illustrates a flowchart for load balancing in intervehicle communication between wireless radiofrequency communication networks and light-based communication networks according to exemplary embodiments. In many embodiments, radio frequency or cellular communications may not be possible or may be limited due to poor network coverage, which may be caused by interference, lack of equipment in rural areas, terrain, and/or other issues. In many embodiments, light-based communication may also be impaired or impacted due to line-of-sight issues including barriers, other large vehicles, and/or weather conditions. In exemplary embodiments, a system and/or method may be utilized to utilize one or the other communication protocols or systems or to shift between radio-frequency communication systems and optical (or light-based) communication systems based on specific conditions and/or communication load. In exemplary embodiments, a system and/or method may be utilized to load balance communications between RF communications and/or optical (or light-based communication systems) based on environmental and/or network conditions. In other words, a hybrid RF-optical communication load balancing algorithm may be utilized in a vehicle to determine which type of communication system may be utilized by the vehicle or vehicles in order to optimize performance or what combination of RF communication and optical communication may be utilized to optimize performance. In exemplary embodiments, an algorithm may be executed in order to load balance between the RF communication and optical or light-based communication in the vehicles. In exemplary embodiments, computer-readable instructions may be accessed from one or more memory devices and may be executed by one or more vehicle processors and/or controllers.

In exemplary embodiments, in step 1005, computer-readable instructions (e.g., software) may be executable by one or more vehicle processors to initiate an automobile-based communication load-balancing process. In some implementations, the software may be initiated on one vehicle, while in other implementations, the software may be initiated on either or both of the vehicles that may be communicating with each other either via optical communications and/or radio-frequency (RF) communications. In exemplary embodiments, in step 1010, optical/light-based communication from a first vehicle (e.g., a plurality of light beams) may be detected by a plurality of light sensors at a second vehicle. In exemplary embodiments, in step 1015, a light-based or optical received signal strength indicator (RSSI) module may analyze the received plurality of light beams and calculate an optical or light-based RSSI measurement for the first vehicle's plurality of light beams, where the first vehicle's optical or light-based RSSI measurement may identify a quality of optical or light-based communications that is available between the first vehicle and the second vehicle.

In exemplary embodiments, in step 1017, an optical signal-to-noise (SNR) module may analyze the received plurality of light beams and calculate an optical or light-based SNR measurement. In these embodiments, the SNR measurement may identify a quality of the optical or light-based communication between the first vehicle and the second vehicle. In exemplary embodiments, in step 1020, the vehicle optical RSSI measurement and/or the optical SNR measurement may be communicated to a vehicle communication load-balancing module where, in step 1025, the vehicle communication load-balancing module may compare the vehicle optical RSSI measurement and/or the optical SNR measurement to expected optical RSSI measurements and/or optical SNR measurements for vehicle-to-vehicle measurements and may generate a light-based communication quality measurement for optical or light-based communication between the first vehicle and the second vehicle.

In exemplary embodiments, in order test RF communication between the first vehicle and the second vehicle, in step 1030, a first vehicle may initiate radiofrequency communications with the second vehicle via a first vehicle wireless communication transceiver. In exemplary embodiments, the first vehicle wireless communication transceiver may communicate with a second vehicle wireless communication transceiver on the second vehicle via 802.11 protocols, WiFi protocols and/or other RF wireless communication protocols. In other embodiments, the first vehicle wireless communication transceiver may communicate with a second vehicle wireless communication transceiver via personal area network protocols (e.g., Bluetooth or Zigbee) or via low power protocols such as Matter or Thread. In exemplary embodiments, in step 1035, the second vehicle wireless communication transceiver may receive the RF communication transmission from the first wireless communication transceiver. In exemplary embodiments, in step 1040, a radiofrequency (RF) RSSI module may analyze the RF communication transmission between the first and the second vehicle and may generate a vehicle RF RSSI measurement. In exemplary embodiments, in step 1045, the vehicle communication load-balancing module may compare the vehicles RF RSSI measurement to expected vehicle RF RSSI in order to determine a quality of RF communication between the first vehicle and the second vehicle or calculate a radiofrequency communication quality control measurement.

In exemplary embodiments, in step 1050, the vehicle communication load balancing module may analyze the optical communication quality measurement and RF communication quality measurement to determine which communication system to utilize or which type of communication should be utilized in order to communicate between the two vehicles (e.g., in other words, should optical or light-based communication or RF communication should be utilized to transmit messages between the two vehicles). In other embodiments, in step 1055, the vehicle communication load balancing module may determine what portion of the vehicle communication should be transmitted via optical or light-based communication and what portions or types of the vehicle communication should be transmitted via RF communication. Examples of 1) strictly light based communications; 2) strictly RF communications and 3) load balanced communications (a certain percentage light or optical based communication and a certain percentage RF communication). In other words, deciding what percentage of the communication should be optical or light based and what percentage of the communication should be radiofrequency based.

Please note that in some implementations, it is not beneficial for the system to switch back between RF-based communications and/or optical (or light-based communications) all the time. In these implementations, there may be a set amount of time that may have to elapse before a switch can be made to the other method of communication. In some implementations, the minimum elapsed timeframe may be one minute, five minutes, an hour, etc.

Figure 11:
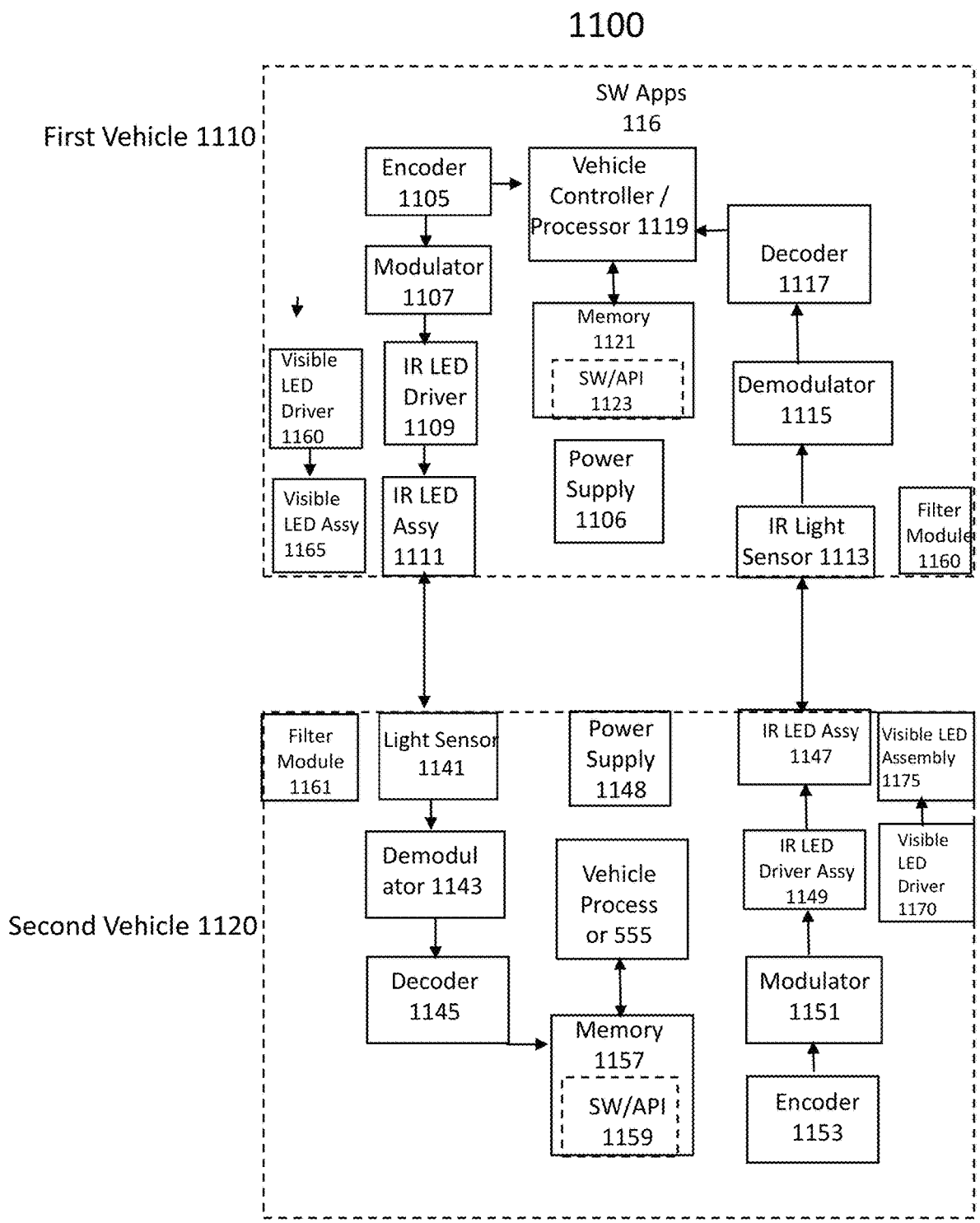
FIG. 11 is a block diagram illustrating different components of an exemplary infrared LED vehicle communication system between a first vehicle and a second vehicle, in accordance with an embodiment of the disclosure

FIG. 11 is a block diagram illustrating different components of an exemplary infrared LED vehicle communication system between a first vehicle and a second vehicle, in accordance with an embodiment of the disclosure. In exemplary embodiments, a normal visible light headlight LED assembly may be too bright and the use of the visible light headlight LED assembly may cause driver discomfort because of the brightness. Accordingly, utilizing the headlight for communication might cause discomfort for drivers approaching the vehicle or in the vicinity of the vehicle. In these circumstances, the headlight assembly may utilize an infrared LED assembly in order to communicate with other vehicles along with infrared light sensors rather than using the normal visible light. FIG. 11 illustrates a block diagram of a first vehicle 1110 communicating with a second vehicle 1120 utilizing infrared light communications according to exemplary embodiments. In exemplary embodiments, the infrared light spectrum utilized with respect to the described subject matter ranges from 800 nanometers to 1800 nanometer. In some implementations, the infrared light spectrum may range from 850 to 1000 nanometers. In exemplary embodiments, the communication system 1100 may include of a first vehicle 1110 communicating with a second vehicle 1120. With reference to FIG. 11, a first vehicle 1110 may include an encoder assembly 1105, a signal modulator 1107, a vehicle infrared LED driver assembly 1109, a vehicle infrared LED assembly 1111, a visible LED driver 1160, a visible LED assembly 1165, a power supply 1106, one or more infrared vehicle light sensors 1113, a signal demodulator 1115, a decoder assembly 1117, a vehicle central controller/processor 1119, and/or one or more vehicle subsystem software (APIs) application programming interfaces 1123.

With reference to FIG. 11, the second vehicle 1120 may include one or more vehicle infrared light sensors 1141, a signal demodulator 1143, a decoder assembly 1145, a vehicle infrared LED driver assembly 1149, a vehicle infrared LED assembly 1147, a visible LED driver assembly 1170, a visible LED assembly 1175, a power supply 1148, a signal modulator 1151, an encoder assembly 1153, a vehicle central controller/processor 1155, one or more memory devices 1157, and/or one or more vehicle subsystem software (APIs) application programming interfaces 1159.

In exemplary embodiments, a first vehicle main controller processor 1119 may execute computer-readable instructions stored in the one or more memory devices 1121 to control operations of the illustrated components in the first vehicle 1110. In order to initiate a communication from the first vehicle 1110 to the second vehicle 1120, the computer-readable instructions may communicate one or more messages to the encoder assembly 1105 in the first vehicle.

In exemplary embodiments, the encoder assembly 1105 may be communicatively coupled and connected to the vehicle controller/processor 1119 and/or a signal modulator 1107. In some implementations, the one or more messages may be encoded by the encoder assembly 1105 and may be communicated to the signal modulator 1107.

In exemplary embodiments, the encoded one or more messages may be modulated by a signal modulator 1107 to generate one or more encoded modulated messages.

In exemplary embodiments, the signal modulator 1107 may be communicatively coupled to the infrared vehicle LED driver assembly 1109. In some implementations, a modulated infrared LED data transmission signal may be generated by the vehicle infrared LED driver assembly 1109 based at least in part on the one or more encoded modulated messages.

In some implementations, the vehicle infrared LED assembly 1111 may be part of or close to a vehicle visible LED headlight 1165 and the plurality of modulated infrared light beams may be transmitted in an outward direction from a front of a first vehicle 1110. In exemplary embodiments, a vehicle visible LED driver 1160 may be activated and may transmit signals, commands or instructions to a vehicle visible LED assembly 1165 and the first vehicle 1100 may generate a plurality of visible light beams to illuminate an area around a first vehicle 1110 or to make the first vehicle visible. In alternative implementations, the vehicle LED assembly 511 may be a vehicle LED taillight in the first vehicle 510 and the plurality of modulated light beams may be transmitted in an outward direction from a rear of a first vehicle 510. In exemplary embodiments, the vehicle infrared LED assembly 1111 is communicatively coupled or connected to the vehicle infrared LED driver assembly 1109. In some implementations, the vehicle infrared LED assembly 1111 in the first vehicle 1110 may be configured to generate a plurality of modulated infrared light beams based on the received modulated LED data transmission signal. The plurality of modulated infrared light beams may be transmitted in an outward direction from the first vehicle 1110. In some implementations, the vehicle infrared LED assembly 1111 may be separate from the vehicle headlight or vehicle visible LED assembly 1165.

In exemplary embodiments, a second vehicle 1120 may receive the plurality of modulated light beams from the first vehicle infrared LED assembly 1111. In some implementations, one or more infrared light sensors 1141 in the second vehicle may detect the plurality of modulated infrared light beams. The one or more infrared light sensors 1141 may detect an intensity of the plurality of modulated infrared light beams.

In exemplary embodiments, an infrared filter module 1161 may filter out unwanted or undesired light frequency wavelengths from being received or captured by the infrared light sensor 1141.

In exemplary embodiments, the one or more light infrared sensors 1141 of the second vehicle 1120 may be configured to generate a modulated data transmission signal representative of a captured intensity of the plurality of modulated infrared light beams.

In exemplary embodiments, the signal demodulator 1143 in the second vehicle 1120 may be communicatively coupled or connected to the one or more infrared light sensors 1141. In some implementations, the signal demodulator 1143 in the second vehicle may be configured to receive the modulated data transmission signal from the one or more infrared light sensors 1141 and may generate a demodulated data transmission signal. The signal demodulator 1143 may transmit the demodulated data transmission signal to the decoder assembly 1145.

In exemplary embodiments, the decoder assembly 1145 in the second vehicle 1120 may be communicatively coupled to the signal demodulator 1143 and/or the second vehicle central processor 1155. In some implementations, the decoder assembly 1145 in the second vehicle 120 may receive the demodulated data transmission signal and may generate a decoded data transmission signal. The decoded data transmission signal should be the same as or similar to the original one or more messages generated by the first vehicle's controller and/or processor 1119.

In exemplary embodiments, the decoder assembly 1145 may be communicatively coupled to the one or more memory devices 1157 and/or the second vehicle central processor or controller 1155. In some implementations, the decoder assembly 1145 may be configured to communicate the decoded data transmission signal to be stored in the one or more memory devices 1121. In some implementations, the second vehicle central processor or controller 11555 may be configured to communicate the decoded data transmission signal to other vehicle subassemblies (as described in FIG. 4) of the second vehicle in order for the other vehicle subassemblies to perform action in response to the received decoded data transmission signal. As an illustrative example, the first vehicle 1110 may be going in the opposite direction from the second vehicle 1120 and may communicate one or more messages from a front part of the first vehicle 1110 via the infrared LED assembly 1111 that is part of or separate from the vehicle visible LED assembly 1165 identifying that an accident has occurred in an area that the first vehicle 1110 recently passed. The second vehicle 1120 may receive the decoded data transmission signal and may communicate the decoded data transmission signal to the vehicle display subsystem 435 in the second vehicle 1120 to display a message identifying an accident is up ahead and/or a vehicle audio subsystem 425 to create an audible message or sound to warn a driver of the second vehicle 1120 there is an accident up ahead.

In some implementations, communications may flow both ways between the first vehicle 1110 and 1120. In some implementations, a first vehicle infrared LED assembly 1111 may communicate one or more modulated messages via a plurality of infrared light beams which may be received as described immediately above. As an illustrative example, a first vehicle infrared LED assembly 511 may communicate a message from a vehicle braking subsystem 405 that a tire is flat or that brakes are failing in order to warn the second vehicle 1120 (who is travelling the same direction and behind the first vehicle 1110) that the brakes or tire has failed. In some implementations, the second vehicle 1120 may generate one or more messages indicating receipt of the error message and asking the first vehicle 1110 if the first vehicle 1110 may need any assistance. This scenario may be described with respect to FIG. 11 below.

In this example, computer-readable instructions 1159 may be accessed from the one or more memory devices 1157 and may be executable by the second vehicle central processor or controller 1155 to receive one or more messages from one or more of the other vehicle subsystems in the second vehicle 1120 to verify receipt and also to ask if the first vehicle 1110 needs more assistance. In some implementations, the encoder assembly 1153 of the second vehicle 1120 may encode the one or more verification and/or assistance messages and may communicate the one or more encoded verification and/or assistance messages to a signal modulator 1151. In some implementations, the signal modulator 1151 of the second vehicle 1120 may modulate the one or more encoded verification and/or assistance messages and create one or more encoded modulated verification and/or assistance messages. The signal modulator 1151 may be configured to communicate the encoded modulated verification messages to the infrared LED driver assembly 1149 in the second vehicle 1120. The infrared LED driver assembly 1149 may be configured to generate a modulated infrared LED transmission response signal based at least in part on the received one or more encoded modulated verification/assistance messages. The infrared LED driver assembly 1149 in the second vehicle may be configured to communicate the modulated infrared LED transmission response signal to the vehicle infrared LED assembly 1147. The vehicle infrared LED assembly 1147 in the second vehicle 1120 may be configured to generate and transmit a plurality of response infrared light beams based at least in part on the modulated infrared LED transmission response signal. In exemplary embodiments, the second vehicle 1120 may also include a visible LED driver assembly 1170 which communicates signals to the visible LED assembly 1175 to generate, transmit and/or emit a plurality of visible light beams in an area around the second vehicle 1120.

In exemplary embodiments, one or more infrared light sensors 1113 on first vehicle 1110 may be configured to detect an intensity of the plurality of response infrared light beams transmitted from the second vehicle infrared LED assembly 1147. In some implementations, the one or more light sensors 1113 in the first vehicle 1110 may be configured to generate a response data transmission signal representative of the detected intensity of the plurality of response infrared light beams. The one or more infrared light sensors 1113 in the first vehicle may communicate the response data transmission signal to the signal demodulator 1115 in the first vehicle 1110. In some implementations, an infrared filter module 1160 may filter out unwanted light frequencies to assist or help the one or more infrared light sensors 1113.

In exemplary embodiments, the signal demodulator 1115 in the first vehicle 1110 may be configured to generate a demodulated response data transmission signal and communicate the demodulated response data transmission signal to the decoder assembly 1117 in the first vehicle 1110. The decoder assembly 1117 may decode the demodulated response data transmission signal to create one or more decoded response messages. In some implementations, the one or more decoded response messages may be stored in one or more memory devices 1121 of the first vehicle 1110.

In some implementations, computer-readable instructions 1123 may be executable by the vehicle controller/processor 1119 to process the decoded response messages and to communicate these decoded messages to an appropriate vehicle subsystem for actions.

In exemplary embodiments, the vehicle communication system 1100 may include a synchronization module within the encoder assemblies 1105 1153. The synchronization module in the encoder assemblies 1105 1153 may be implemented in software, hardware and/or a combination thereof. In some implementations, a synchronization module in the encoder assemblies 1105 1153 may be configured to synchronize the one or more infrared light sensors 1113 and 1141 and the one or more encoded messages generated by the encoding assemblies 1105 1153. In some implementations, the encoder assemblies 1105 1153 may utilize a code division multiple access (CDMA) protocol for synchronization. As an example, encoder assemblies 1105 1153 may assign one or more encoded messages a specific code, utilizing CDMA protocols. The one or more infrared light sensors 1113 1141 may be configured to capture the plurality of reflected infrared light beams that include the assigned specific code. The other reflected infrared light beams may be discarded and not utilized. Stray light from other light sources such as other automobiles, street lights, natural light sources like the moon and the sun, for example, may be picked up by the one or more infrared light sensors 1113 1141. However, utilizing CDMA filtering and protocols allows the vehicle communication system to filter out and utilize only the plurality of reflected light beams that are transmitted by the vehicles infrared LED light assemblies 1111 and 1147. This technique improves an accuracy of the vehicle infrared LED communication system 1100.

Figure 12:
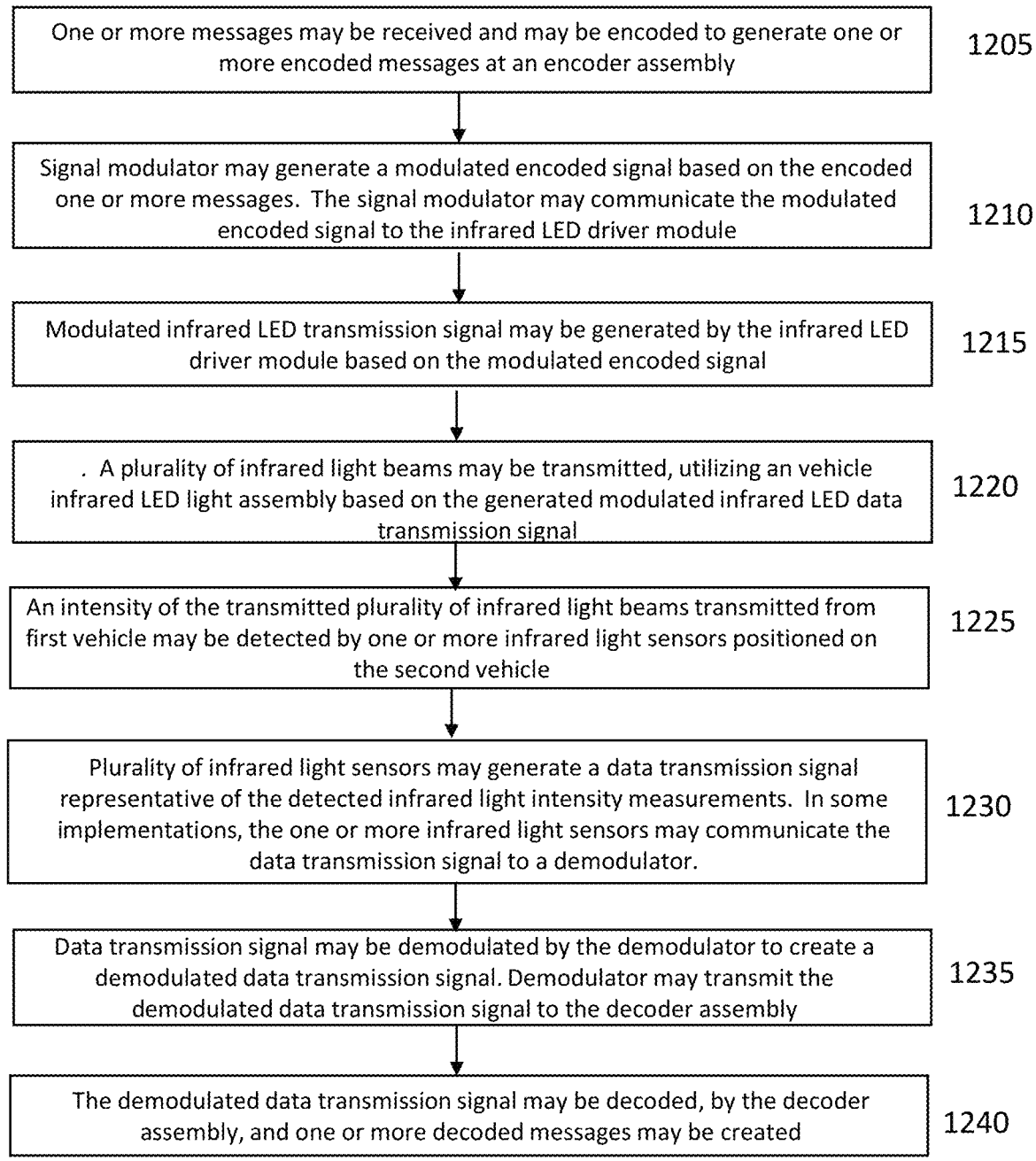
FIG. 12 is a flowchart that illustrates an exemplary method for utilizing a vehicle infrared light emitting diode (LED) light assembly (e.g., that may be part of or separate from a LED head light and tail light) for communications between a first vehicle and a second vehicle, in accordance with an embodiment of the disclosure.

FIG. 12 is a flowchart that illustrates an exemplary method for utilizing a vehicle infrared light emitting diode (LED) light assembly (e.g., that may be part of or separate from a LED head light and tail light) for communications between a first vehicle and a second vehicle, in accordance with an embodiment of the disclosure. FIG. 12 is explained in conjunction with elements from FIGS. 4 and 11. With reference to FIG. 12, there is shown a flowchart 1200 comprising exemplary operations 1205 to 1240.

In an exemplary embodiment, one vehicle (or an operator thereof) may desire to communicate information and data to a second vehicle (or an operator thereof). In some implementations, in situations where cellular networks and/or other wireless networks are inoperable due to failure, maintenance and/or weather, one vehicle may need an additional method and/or system for automatic or and/or timely communication of information and data. This is an important application of the LED light assembly vehicle communication system 1100 during emergency situations when no other method of communication may be available.

A vehicle or operator may generate one or more messages to communicate to another vehicle. These messages may include vehicle speed information, vehicle operation information (e.g., are parts malfunctioning), and/or emergency alert information. At 1205, one or more messages may be received and may be encoded to generate one or more encoded messages at an encoder assembly 1105.

In exemplary embodiments, a signal modulator 1107 may receive the encoded one or more messages. At 1210, a signal modulator 1107 may generate a modulated encoded signal based on the encoded one or more messages. The signal modulator may communicate the modulated encoded signal to the infrared LED driver module 1109.

At 1215, a modulated infrared LED transmission signal may be generated by the infrared LED driver module 1109 based on the modulated encoded signal. The modulated infrared LED transmission signal may be representative of the encoded one or more messages. In some implementations, the modulated infrared LED transmission signal may modulate an intensity of a plurality of infrared light beams.

The vehicle infrared LED light assembly 1111 may receive the modulated infrared LED transmission signal from the infrared LED driver module 1109. At step 1220, in an exemplary embodiment, a plurality of infrared light beams may be transmitted, utilizing a vehicle infrared LED light assembly 1111, based at least in part on the generated modulated infrared LED data transmission signal.

In exemplary embodiments, a second vehicle 1120 may receive the plurality of infrared light beams transmitted by the first vehicle 1110. In some implementations, the infrared LED light assembly 1111 of the first vehicle 1110 may be part of a visible LED headlight or may be separated from the visible LED headlight. In this implementation, if the second vehicle 1120 is traveling a same direction as the first vehicle 1110, one or more receiving infrared light sensors 1141 may be located on a back portion of the vehicle (e.g., a vehicle rear bumper). In some implementations, if a second vehicle 1120 is traveling an opposite direction as compared to a first vehicle 1110, one or more receiving infrared light sensors may be located on a front portion of the vehicle, (e.g., a vehicle front bumper). In some implementations, the infrared LED light assembly 1111 of the first vehicle may be part of an LED taillight or may be separate from the LED taillight. In this implementation, if the second vehicle 1120 is traveling a same direction as the first vehicle 1110, one or more receiving infrared light sensors 1141 may be located on a front portion of the second vehicle 1120 (e.g., the second vehicle front bumper). In this implementation, if the second vehicle 1120 is travelling an opposite direction from the first vehicle 510, one or more receiving infrared light sensors 1141 may be located on a back portion of the second vehicle 1120 (e.g., the second vehicle rear bumper).

At step 1225, an intensity of the transmitted plurality of infrared light beams transmitted from the first vehicle 1110 may be detected by a second vehicle 1120, by one or more infrared light sensors 1141 positioned on the second vehicle 1120. In some implementations, in step 1230, the plurality of infrared light sensors 1141 may generate a data transmission signal representative of the detected infrared light intensity measurements. In some implementations, the one or more infrared light sensors 1141 may communicate the data transmission signal to a demodulator 1143.

In exemplary embodiments, the demodulator 1143 may receive the data transmission signal. At step 1235, the data transmission signal may be demodulated by the demodulator 1143 to create a demodulated data transmission signal. In some implementations, the demodulator 1143 may transmit the demodulated data transmission signal to the decoder assembly 1145.

In exemplary embodiments, the decoder assembly 1145 may receive the demodulated data transmission signal. At step 1240, the demodulated data transmission signal may be decoded, by the decoder assembly 1145, and one or more decoded messages may be created. The one or more decoded messages should be the same or very similar to the generated one or more messages transmitted to the first vehicle's encoder 1105 in step 1205.

In some implementations, the one or more decoded messages may be stored in one or more memory devices 1157 of the second vehicle 1120. In some implementations, software instructions 1159 stored in the one or more memory devices 1157 may be executable by the second vehicle central processors 1155 to communicate the one or more decoded messages to other vehicle subsystems of the second vehicle 1120.

In exemplary embodiments, the vehicle LED assembly (see FIG. 5) and the infrared LED assembly (see FIG. 11) may be placed anywhere on the vehicle in order to improve communications between the two vehicles. In other words, the vehicle LED assembly or the infrared vehicle LED assembly may not be located in the head light or the tail light of the vehicles. In these embodiments, the light sensors (see FIG. 5) and the infrared light sensors (see FIG. 11) may be placed anywhere on the vehicles in order to receive the communication from the vehicle LED assembly or the infrared LED assembly. This may allow vehicles to communicate with each other utilizing light communications or infrared light communications without driving towards the vehicle or being behind the vehicle (where they are in the light path of the headlight or taillight of the other vehicle).

In some embodiments, a method of communicating between a first vehicle and a second vehicle utilizing light-emitting diode (LED) light assemblies include encoding a vehicle data transmission from a first vehicle; generating a modulation signal based on the encoded vehicle data transmission; generating, via a vehicle LED driver module, a modulated LED data transmission signal, based at least in part on the modulation signal representative of the encoded vehicle data transmission, the modulated LED data transmission signal to modulate an intensity of the light beams; and transmitting a plurality of light beams, utilizing a vehicle LED light assembly, based at least in part on the generated modulated LED data transmission signal. The method of communicating between a first vehicle and a second vehicle also includes detecting, via one or more light sensors positioned on the second vehicle, an intensity of the plurality of light beams transmitted from LED light assembly on the first vehicle; generating, via the one or more light sensors, a data transmission signal representative of the captured intensity of the plurality of light beams; demodulating, via a demodulator module, the data transmission signal representative of the captured intensity of the plurality of light beams; and decoding the demodulated data transmission signal to obtain the original vehicle data transmission. The method of communicating between a first vehicle and a second vehicle further includes encoding a response vehicle data transmission from the second vehicle; generating a modulation signal based on the encoded response vehicle data transmission; generating, via a second LED driver module, a modulated LED data transmission response signal, based at least in part on the modulation signal representative of the encoded response vehicle data transmission, the modulated LED data transmission response signal to modulate an intensity of the light beams; transmitting a plurality of response light beams, utilizing an vehicle LED light assembly, based at least in part on the generated modulated LED data transmission response signal. In addition, the method of communication between a first vehicle and a second vehicle detecting, via one or more light sensors positioned on the first vehicle, an intensity of the plurality of light beams transmitted from the vehicle LED light assembly on the first vehicle; generating, via the one or more light sensors on the first vehicle, a response data transmission signal representative of the captured intensity of the plurality of response light beams; demodulating, via a demodulator module, the response data transmission signal representative of the captured intensity of the plurality of response light beams; and decoding the demodulated response data transmission signal to obtain the original response vehicle data transmission.

In some embodiments, a system to communicate between a first vehicle and a second vehicle utilizing vehicle light-emitting diode assemblies, includes an encoding assembly to encode a vehicle data transmission from a first vehicle; a signal modulator to generate a modulation signal based on the encoded vehicle data transmission; a vehicle LED driver module to generate a modulated LED data transmission signal, based at least in part on the modulation signal representative of the encoded vehicle data transmission, the modulated LED data transmission signal to modulate an intensity of the light beams; and a vehicle LED light assembly, positioned on the first vehicle, to transmit a plurality of light beams based at least in part on the generated modulated LED data transmission signal. In some embodiments, a system to communicate between a first vehicle and a second vehicle utilizing vehicle light-emitting diode assemblies, includes one or more light sensors, positioned on a second vehicle, to detect an intensity of the plurality of light beams transmitted from the vehicle LED light assembly on the first vehicle and to generate a data transmission signal representative of the captured intensity of the plurality of light beams; a demodulator module on the second vehicle, to demodulate the data transmission signal representative of the captured intensity of the plurality of light beams; and a decoder assembly to decoding the demodulated data transmission signal to obtain the original vehicle data transmission.

In some embodiments, the method of communicating between a first vehicle, a second vehicle and a third vehicle utilizing vehicle light-emitting diode (LED) light assemblies, includes detecting, via one or more light sensors positioned on the second vehicle, an intensity of the plurality of light beams transmitted from a vehicle LED light assembly on the first vehicle; generating, via the one or more light sensors of the second vehicle, a data transmission signal representative of the detected intensity of the plurality of light beams; demodulating, via a demodulator module, the data transmission signal representative of the captured intensity of the plurality of light beams; decoding the demodulated data transmission signal to obtain the original vehicle data transmission from the first vehicle; and encoding, at the second vehicle, the original vehicle data transmission. The method of communicating between a first vehicle, a second vehicle, and a third vehicle utilizing vehicle LED light assemblies also includes generating, at the second vehicle, an intermediary modulation signal based on the encoded original vehicle data transmission; generating, at the second vehicle, via a second vehicle LED driver module, a modulated intermediary LED data transmission signal, based at least in part on the intermediary modulation signal representative of the encoded original vehicle data transmission, the intermediary modulated LED data transmission signal to modulate an intensity of the light beams; and transmitting, to the third vehicle, a plurality of intermediary light beams, utilizing a second vehicle LED light assembly, based at least in part on the generated intermediary modulated LED data transmission signal.

While various embodiments described in the present disclosure have been described above, it should be understood that they have been presented by way of example, and not limitation. It is to be understood that various changes in form and detail can be made therein without departing from the scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in a non-transitory computer-readable medium configured to store the software. Such software can enable, for example, the function, fabrication, modeling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer-readable medium, such as semiconductor, magnetic disc, or optical disc (e.g., CD-ROM, DVD-ROM, etc.). The software can also be disposed as computer data embodied in a non-transitory computer-readable transmission medium (e.g., solid state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the internet and intranets.

Although illustrated as separate elements, the method steps described and/or illustrated herein may represent portions of a single application. In addition, in some embodiments one or more of these steps may represent or correspond to one or more software applications or programs that, when executed by a computing device, may cause the computing device to perform one or more tasks, such as the method step.

In addition, one or more of the devices described herein may transform data, physical devices, and/or representations of physical devices from one form to another. For example, one or more of the devices recited herein may receive image data of a sample to be transformed, transform the image data, output a result of the transformation to determine a 3D process, use the result of the transformation to perform the 3D process, and store the result of the transformation to produce an output image of the sample. Additionally or alternatively, one or more of the modules recited herein may transform a processor, volatile memory, non-volatile memory, and/or any other portion of a physical computing device from one form of computing device to another form of computing device by executing on the computing device, storing data on the computing device, and/or otherwise interacting with the computing device.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and shall have the same meaning as the word "comprising.

The processor as disclosed herein can be configured with instructions to perform any one or more steps of any method as disclosed herein.

As used herein, the term "or" is used inclusively to refer items in the alternative and in combination.

As used herein, characters such as numerals refer to like elements.

Embodiments of the present disclosure have been shown and described as set forth herein and are provided by way of example only. One of ordinary skill in the art will recognize numerous adaptations, changes, variations and substitutions without departing from the scope of the present disclosure. Several alternatives and combinations of the embodiments disclosed herein may be utilized without departing from the scope of the present disclosure and the inventions disclosed herein. Therefore, the scope of the presently disclosed inventions shall be defined solely by the scope of the appended claims and the equivalents thereof.

What is claimed is:

1. A vehicle communication system to establish communication between a first vehicle and a second vehicle utilizing vehicle light-emitting diode (LED) light assemblies, comprising:
   a red-green-blue (RGB) encoder, the RGB encoder configured to receive a first data stream associated with a red color, a second data stream associated with a green color, and a third data stream associated with a blue color and to encode the first data stream, the second data steam and the third data stream to generate a first vehicle encoded red data transmission, a first vehicle encoded blue data transmission, and a first vehicle encoded green data transmission from the first vehicle;
   a modulator coupled to the RGB encoder, the modulator configured to generate a modulation signal based on the first vehicle encoded red data transmission, the first vehicle encoded blue data transmission, and the first vehicle encoded green data transmission;
   a first vehicle LED driver module, the first vehicle LED driver module configured to receive the modulation signal and to transmit a modulated red LED data transmission signal, a modulated blue LED data transmission signal and/or a modulated green LED data transmission signal;
   an RGB LED assembly, the RGB LED assembly configured to receive the modulated red LED data transmission signal, the modulated blue LED data transmission signal and/or the modulated green LED data transmission signal and to modulate an intensity of red LED light beams, modulate an intensity of blue LED light beams and modulate an intensity of green LED light beams and transmit the red light beams, the blue light beams and the green light beams, wherein the red light beams, the blue light beams and the green light beams become a plurality of composite light beams;
   one or more red light wavelength filters, positioned on the second vehicle, the one or more red light wavelength filters configured to receive the plurality of composite light beams and to pass through the red light beams;

one or more blue light wavelength filters, positioned on the second vehicle, the one or more blue light wavelength filters configured to receive the plurality of composite light beams and to pass through the blue light beams;

one or more green light wavelength filters, positioned on the second vehicle, the one or more green light wavelength filters configured to receive the plurality of composite light beams and to pass through the green light beams; and one or more light sensors, coupled to the one or more red light wavelength filters, the one or more blue wavelength filters, the one or more green wavelength filters, the one or more light sensors configured to receive the red light beams, the blue light beams, and the green light beams, the one or more light sensors configured to generate a red data transmission signal representative of a captured intensity of the red light beams, a green data transmission signal representative of a captured intensity of the green light beams and a blue data transmission signal representative of a captured intensity of the blue light beams.

2. The vehicle communication system of claim 1, wherein the RGB LED assembly is positioned within a head lamp of the first vehicle.

3. The vehicle communication system of claim 2, wherein the one or more light sensors are positioned within a taillight of the second vehicle.

4. The vehicle communication system of claim 1, wherein the RGB LED assembly Is positioned within a taillight of the first vehicle.

5. The vehicle communication system of claim 4, further including a demodulator modulator coupled to the one or more light sensors, the demodulator modulator configured to demodulate the red data transmission signal, the blue data transmission signal and/or the green data transmission signal to generate demodulated red data transmission signals, demodulated green data transmission signals and demodulated blue data transmission signals.

6. The vehicle communication system of claim 5, further including a RGB decoder coupled to the demodulator module, the RGB decoder configured to decode the demodulated red data transmission signals to obtain an original first vehicle red data transmission; decode the demodulated green data transmission signals to obtain an original first vehicle green data transmission; and decode the demodulated blue data transmission signals to obtain an original first vehicle blue data transmission and to store the original first vehicle red data transmission, the original first vehicle green data transmission and the original first vehicle blue data transmission in one or more memory devices of the second vehicle.

7. The vehicle communication system of claim 1, wherein the first vehicle infrared LED light assembly is positioned within a head lamp of the first vehicle.

8. The vehicle communication system of claim 1, wherein the first vehicle infrared LED light assembly Is positioned within a taillight of the first vehicle.

9. A vehicle communication system to establish communication between a first vehicle and a second vehicle utilizing vehicle infrared light-emitting diode (LED) light assemblies, comprising:

a first encoder, the first encoder configured to encode a vehicle communication request generated by the first vehicle;

a first modulator, the first modulator coupled to the first encoder, the first modulator configured to generate a modulation signal based on the encoded vehicle communication request;

a first vehicle infrared LED driver module coupled to the first modulator, the first vehicle infrared LED driver module configured to generate a modulated LED communication request signal, based at least in part on the modulation signal representative of the encoded vehicle communication request, the modulated LED communication request signal to modulate an intensity of infrared light beams;

a first vehicle infrared LED light assembly coupled to the first vehicle infrared LED driver module, the fist vehicle infrared LED light assembly configured to transmit a plurality of infrared light beams, based at least in part on the generated modulated LED communication request signal;

one or more second vehicle infrared light sensors, the one or more second vehicle infrared light sensors configured to detect an intensity of the plurality of infrared light beams transmitted from the first vehicle infrared LED light assembly and to generate a vehicle communication request signal based on the detected intensity;

a second vehicle demodulator module coupled to the one or more second vehicle infrared light sensors, the second vehicle demodulator module configured to demodulate the vehicle communication request signal;

a second vehicle decoder coupled to the first demodulator module, the second vehicle decoder configured to decode the vehicle communication request signal to obtain the vehicle communication request signal and transfer the vehicle communication request signal; and a second vehicle processor or controller coupled to the second vehicle decoder, the second vehicle processor or controller including computer-readable instructions, the computer-readable instructions to receive the vehicle communication request signal, to generate a communication request message and to transfer the communication request message to a second vehicle display device or a second vehicle audio output device to present to the second vehicle operator.

10. The vehicle communication system of claim 9, wherein the computer-readable instructions are executable by the second vehicle processor or controller to receive a new response message, via a vehicle audio device, video device or touchscreen device if the second vehicle operator agrees to communicate with a first vehicle operator.

11. The vehicle communication system of claim 10, wherein the computer-readable instructions are executable by the second vehicle processor or controller to communicate the new response message to the second vehicle encoder, the second vehicle encoder coupled to the second vehicle processor or controller.

12. The vehicle communication system of claim 11, the second vehicle encoder configured to generate and communicate an encoded response message;

a second vehicle modulator coupled to the second vehicle encoder and configured to generate a second modulation signal based at least in part on the encoded new response message;

a second vehicle infrared LED driver module coupled to the second vehicle modulator, the second vehicle infrared LED driver module configured to generate a modulated LED new response signal, based at least in part on the second modulation signal representative of the encoded new response message; and a second vehicle infrared LED light assembly coupled to the second vehicle infrared LED driver module, the second vehicle infrared LED light assembly configured to transmit a plurality of response infrared light beams, based at least in part on the generated modulated LED new response signal.

13. The vehicle communication system of claim 12, the first vehicle further including:
a plurality of first vehicle infrared light sensors, the plurality of first vehicle infrared light sensors configured to receive the plurality of response infrared light beams that were based, at least in part, on the generated modulated LED new response signal and to generate a modulated vehicle new response signal based, at least in part, on a detected intensity of the plurality of response infrared light beams from the second vehicle LED light assembly;
a first vehicle demodulator module coupled to the plurality of first vehicle infrared light sensors, the first vehicle demodulator module configured to demodulate the generated modulated vehicle new response signal;
a first vehicle decoder coupled to the first vehicle demodulator module, the first vehicle decoder decoding the demodulated vehicle new response signal to obtain a vehicle new response signal and transfer the vehicle new response signal; and
the first vehicle processor or controller coupled to the first vehicle decoder, the first vehicle processor or controller including computer-readable instructions, the computer-readable instructions to receive the vehicle new response signal, to generate a response message and to transfer the response message to a first vehicle display device or a first vehicle audio output device to present to the first vehicle operator.

14. The vehicle communication system of claim 13, wherein the computer-readable instructions are executable by the first vehicle processor or controller to receive a conversation initiation message, via the first vehicle audio device, the first vehicle video device or the first vehicle touchscreen device if the second vehicle operator's new response message indicated an interest in engaging in communication with the first vehicle operator.

15. The vehicle communication system of claim 14, wherein the computer-readable instructions are executable by the first vehicle processor or controller to communicate the conversation initiation message to the first vehicle encoder to start a process of initiating the conversation between the first vehicle and the second vehicle.

16. The vehicle communication system of claim 15, wherein the plurality of infrared light beams and the plurality of response infrared light beams have frequencies or wavelengths ranging from 850 to 1000 nanometers.

17. A method of vehicular communication load balancing, comprising:
computer-readable instructions stored in one or more memory devices, accessible by the one or more vehicle processors and executable by one or more vehicle processors to:
detect, at a plurality of light sensors of a second vehicle, a plurality of light beams transmitted from a first vehicle;
analyze, by a light-based received signal strength indicator (RSSI) module, the received plurality of light beams;
calculate an optical RSSI measurement of the first vehicle plurality of light beams, where the calculated optical RSSI measurement may identify a quality of a light-based communications that is available between the first vehicle and the second vehicle;
analyze, by an optical signal-to-noise (SNR) module, the received plurality of light beams;
calculate an optical SNR measurement of the received plurality of light beams; and
receive, by a vehicle communication load-balancing module, the calculated optical RSSI measurement and the optical SNR measurement and compare the received vehicle optical RSSI measurement and the optical SNR measurement to expected optical RSSI measurements and calculated optical SNR measurements to generate a light-based quality measurement of the light-based communication between the first vehicle and the second vehicle.

18. The method of claim 17, further comprising:
initiate radiofrequency communications from the first vehicle utilizing a first wireless communication transceiver;
receive the radiofrequency communications at the second vehicle utilizing a second wireless communication transceiver;
analyze, via a radiofrequency (RF) RSSI module, the radiofrequency communications received at the second vehicle and generate a vehicle RF RSSI measurement; and
compare, by the load balancing module, the generated vehicle RF RSSI measurement to expected vehicle RF RSSI measurements to generate a RF communication quality measurement for the radiofrequency communications between the first vehicle and the second vehicle.

19. The method of claim 18, further comprising:
comparing the light-based communication quality measurement and the RF communication quality measurement to determine whether light-based communication or radiofrequency communications should be utilized between the first vehicle and the second vehicle by identifying which of the light-based communication quality measurement and the RF communication quality measurement is higher and initiating communication between the first vehicle and the second vehicle with communication method with a highest quality measurement.

20. The method of claim 18, further comprising:
determining, by the load balancing module, a first percentage of communications between the first vehicle and the second vehicle that should be radiofrequency communications based on the RF communication quality measurement; and
determining, by the load balancing module, a second percentage of communications between the first vehicle and the second vehicle that should be light-based communication based on the light-based communication quality measurement.

* * * * *